US012745297B2

(12) United States Patent
Matekovic et al.

(10) Patent No.: US 12,745,297 B2
(45) Date of Patent: Sep. 22, 2026

(54) NETWORK NODE AND METHODS FOR HANDLING X2-C CONNECTION SETUPS IN A MULTI OPERATOR RADIO ACCESS NETWORK SYSTEM

(71) Applicant: Telefonaktiebolaget LM Ericsson (publ), Stockholm (SE)

(72) Inventors: Domagoj Matekovic, Zagreb (HR); Karin Hedén, Sundbyberg (SE); Mirjana Razov, Strmec (HR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

(21) Appl. No.: 18/836,035

(22) PCT Filed: Mar. 1, 2022

(86) PCT No.: PCT/EP2022/055155

§ 371 (c)(1),
(2) Date: Aug. 6, 2024

(87) PCT Pub. No.: WO2023/165683

PCT Pub. Date: Sep. 7, 2023

(65) Prior Publication Data

US 2025/0119766 A1 Apr. 10, 2025

(51) Int. Cl.
*H04W 76/11* (2018.01)
*H04W 8/00* (2009.01)
*H04W 92/20* (2009.01)

(52) U.S. Cl.
CPC ............ *H04W 76/11* (2018.02); *H04W 8/005* (2013.01); *H04W 92/20* (2013.01)

(58) Field of Classification Search
CPC ..... H04W 76/10; H04W 76/11; H04W 8/005; H04W 92/20
See application file for complete search history.

(56) References Cited

U.S. PATENT DOCUMENTS 10,939,365 B1 * 3/2021 Sung ..................... H04W 24/08
2013/0183971 A1 * 7/2013 Tamaki ............. H04W 36/0061
455/436

(Continued)

FOREIGN PATENT DOCUMENTS

CN 107094309 A 8/2017
CN 110545549 A 12/2019

(Continued)

OTHER PUBLICATIONS

"21.Q3: Cell-Defined Primary PLMN ID for Shared LTE RAN", Dec. 16, 2021, 3 pages.

(Continued)

*Primary Examiner* — Kevin C. Harper
(74) *Attorney, Agent, or Firm* — Murphy, Bilak & Homiller, PLLC

(57) ABSTRACT

A method performed by a first network node is provided. The method is for handling X2-C connection setups in a Multi Operator Radio Access Network. MORAN, system of a wireless communications network. The first network node is operating in the MORAN system. When receiving (401) an Automatic Neighbour Relation, ANR, initiated report, from the UE, which report comprises one or more identifiers identifying respective one or more neighbouring cells, the first network node unlocks, or creates and unlocks (402) one or more network node termination point Managed Objects. MOs, based on the respective identifier out of the one or more identifiers. And based on the unlocked, or created and unlocked, one or more network node termination point MOs, the first network node initiates (403) X2-C interface connection setups between the first network node and the respective one or more neighbouring nodes serving the respective identified one or more neighbouring cells. The X2-C interface connections are adapted to be setup only for one X2-C configuration out of all supported X2-C configu- (Continued)

rations on the MORAN system based on the one or more identifiers. The X2-C interface connections are related to each of the respective one or more neighbouring nodes.

14 Claims, 16 Drawing Sheets

(56) References Cited

U.S. PATENT DOCUMENTS

| | | | |
|---|---|---|---|
| 2014/0370894 | A1 | 12/2014 | Hosdurg et al. |
| 2017/0339594 | A1 | 11/2017 | Park et al. |
| 2017/0359737 | A1 | 12/2017 | Singh et al. |
| 2020/0092795 | A1 | 3/2020 | Raval et al. |

FOREIGN PATENT DOCUMENTS

| | | | |
|---|---|---|---|
| CN | 107592649 | B | 6/2020 |
| WO | 2017205792 | A1 | 11/2017 |
| WO | 2018009111 | A1 | 1/2018 |
| WO | 2018111163 | A1 | 6/2018 |

OTHER PUBLICATIONS

"3rd Generation Partnership Project; Technical Specification Group Services and System Aspects; Network Sharing; Architecture and functional description (Release 16)", 3GPP TS 23.251 V16.0.0, Jul. 2020, 39 pages.

"3rd Generation Partnership Project; Technical Specification Group Services and System Aspects; Telecommunication management; Configuration Management (CM); Name convention for managed objects (Release 16)", 3GPP TS 32.300 V16.0.0, Jul. 2020, 27 pages.

"Shared LTE RAN", 133/221 04-LZA 701 6014/1 Uen DH, Jan. 18, 2022.

* cited by examiner

Continue at A In Fig. 6b

NETWORK NODE AND METHODS FOR HANDLING X2-C CONNECTION SETUPS IN A MULTI OPERATOR RADIO ACCESS NETWORK SYSTEM

TECHNICAL FIELD

Embodiments herein relate to a network node and methods therein. In some aspects, they relate to handling of X2-C connection setups in a Multi Operator Radio Access Network (MORAN) system of a wireless communications network.

BACKGROUND

In a typical wireless communication network, wireless devices, also known as wireless communication devices, mobile stations, stations (STA) and/or User Equipment (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas or tracking areas or location areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNnodeB (gNB) as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specification of standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

MORAN

MORAN is a RAN configuration in which network operators are sharing a network node such as a RAN node, e.g. an eNodeB. The resources of the RAN network node may be split for two or more network operators. In a MORAN system, each network operator has its own separate core network.

MORAN on separate basebands is a system in which each network operator has its own baseband unit, e.g. a RAN backhaul terminating unit of a radio base station responsible for data processing and signaling.

MORAN by using Multi Operator Core Network (MOCN) is a shared LTE RAN system in which operators share one baseband unit. The system setup enables shared cells to behave like non-shared dedicated cells. Shared cells are dedicated to a shared operator. The shared operator is the owner of an additional Public Land Mobile Network (PLMN). The shared cells are dedicated to the sharing operator by broadcasting non-used primary PLMN as reserved in shared cells' System Information Block (SIB) 1 message, such as e.g., in Information Element (IE) Reserved For Operator Use (reservedForOperatorUse).

MORAN on single baseband is a system that allows propagation of Cell defined primary PLMN instead of Node defined primary PLMN. It provides a configuration that avoids broadcasting of non-used (reserved) primary PLMN in cells' SIB1 messages.

A MORAN cell in MORAN on single baseband is configured with Cell defined primary PLMN which belongs to a sharing operator. By this configuration the Node defined primary PLMN of the system which belongs to a primary operator is overwritten in a new MORAN cell.

The MORAN cell broadcasts in SIB1, only Cell defined primary PLMN for the shared operator and thus the shared operator has dedicated radio resources.

The MORAN cell is seen from the RAN network as a cell belonging to a separate logical eNodeB as it has Global eNB ID constructed from Cell defined primary PLMN which is different from Global eNB ID constructed from the Node defined primary PLMN. For a logical eNodeB with the Global eNB ID constructed from the Cell defined primary PLMN, the functionality allows support for S1-C connectivity towards core network and X2-C connectivity towards a neighboring eNodeB. X2-C is the interface between RAN network nodes such as eNodeBs.

An example scenario of MORAN on Single Baseband is depicted in FIG. 1.

FIG. 1 depicts as a physical eNodeB 10 belonging to, e.g. owned by, a primary operator 0. The physical eNodeB 10 of the operator 0 is assigned a Global ENB ID being: plmn0+ and eNB ID 0. The node eNodeB 10 comprises a node defined primary PLMN of plmn0.

The physical eNodeB 10 provides a MORAN cell 11. The MORAN cell 11 defines a Primary PLMN belonging to a shared operator 1, a System Information Block (SIB) 1 of the MORAN cell 11 is plmn1 defined on the MORAN cell.

The cells 12 and 13 have no configured PLMNs that are already configured on MORAN cell 11. The physical eNodeB 10 may further provide a Non-Shared Cell 12. The Non-Shared Cell 12 comprises a node defined primary PLMN of plmn0 belonging to the primary operator 0, and a SIB 1 of plmn0, (but defines no secondary PLMN). The physical eNodeB 10 may further provide a Shared Cell 13. The Shared Cell 13 comprises a node defined primary PLMN of plmn0 belonging to the primary operator 0, and an additional PLMN of operator 3, plmn3. The Shared Cell 13 comprises a SIB 1 of plmn0 and a SIB 1 of plmn3.

In FIG. 1 it can be seen an RBS node using MORAN on single baseband configuration.

Another example of MORAN on single baseband system is depicted in FIG. 2.

FIG. 2 depicts a System supporting logical eNodeBs with MORAN cell having Cell defined PLMN belonging to the shared operator, i.e. a MORAN on single baseband system.

In the example scenario of FIG. 2, in addition to the scenario in FIG. 1, the physical eNodeB 10 is connected to a CN 20 of plmn0, owned by the operator 0, over an S1-C interface.

Further the MORAN cell 11 is represented by logical eNodeB 21. The logical eNodeB 21 is connected to a CN 22 of plmn1, owned by the operator 1, over an S1-C interface. The logical eNodeB 21 is assigned a Global eNB ID of plmn1 and a an eNB ID 0. The Cell defined primary PLMN is plmn1.

Supported X2-C configurations on MORAN on single baseband system comprises the below A, B and C. Establishment of these X2-C configurations is based on 3GPP standard.

(A) MORAN on single baseband eNodeB towards dedicated eNodeB (eNodeB of same or other vendor.)

(B) MORAN on single baseband eNodeB towards shared eNodeB (eNodeB of same or other vendor.) with shared MOCN cell.

(C) MORAN on single baseband eNodeB towards other MORAN on single baseband eNodeB.

Information that is exchanged between management systems is modeled in terms of Managed Objects. MOs are views of resources, these resources may exist independently of management concerns, or may exist to support the management of other resources. An MO may represent, for example, a modem, a log, or a circuit. In order to allow effective definition of a growing set of MOs, object-oriented design principles are used. Object-oriented design is characterized by the definition of objects, where an object is an abstraction of a physical or logical thing. There is not necessarily a one-to-one mapping between MOs and real resources. An MO may represent one or more resources. These resources may be managed elements or parts of the management solution. Likewise, a resource may be represented by a zero, one, or more MOs. If a resource is not represented by a MO, it cannot be managed across an interoperable interface. An MO may provide an abstract view of resources that are represented by other MOs.

MO is a term defined in 3GPP TS 32.300: Telecommunication management; Configuration Management (CM); Name convention for Managed Objects.

A Termination Point To eNodeB (TermPointToENB) MO when used herein may mean an MO related to a termination point to an eNB. TermPointToENB MOs are used in the MORAN on single baseband system. A TermPointToENB MO models a local eNodeB termination point of an X2 link between the local eNodeB and a neighbour eNodeB. TermPointToENB MOs used in the MORAN on single baseband system distinguish which X2-C connection belongs to which logical eNodeB.

SUMMARY

As a part of developing embodiments herein a problem was identified by the inventors and will first be discussed.

To eliminate memory waste on unneeded TermPointToENB MOs and to eliminate resource waste on unneeded X2-C connection setup, only required X2-C connections are created in MORAN on single baseband system:

- X2-C connections between eNBs with equal primary PLMN IDs.
- X2-C connections from local MORAN on single baseband system shared cell's additional PLMN IDs to neighboring dedicated eNodeBs with matching primary PLMN IDs X2-C and neighboring shared eNBs with matching additional PLMN Ids.

In case of supported X2-C configuration B, MORAN on single baseband system supports MO TermPointToENB increased cardinality. One or more TermPointToENB MOs may be created under a same External eNodeB Function (ExternalENodeBFunction) MO representing neighboring eNodeB with shared MOCN cell, resulting in one or more X2-C connections towards the same neighbouring eNB. A neighbouring eNB differentiates X2-C connections, each per logical eNB.

System initiated X2 connection setups, and X2-C connections setups are prevented in the MORAN on single baseband system. The MORAN on Single Baseband system increases the number of X2-C connections, where secure resources may be wasted on unnecessary X2-C connections. The MORAN on single baseband system has a limitation which comprises that the X2-C connection setup is possible only on incoming X2-C setup request by the MORAN on single baseband system and by the operator.

In the MORAN on single baseband system, an Automated Neighbor Relation (ANR) is prevented to create TermPointToENB MO. The ANR function is used to automatically find and create neighbour cells and eNodeB: s, with respective TermPointToENB, in order to enable the eNodeB: s to keep a moving UE in good radio coverage. This means that when ANR is prevented, instead the TermPointToENB MO: s to all neighbouring eNodeB: s have to be manually configured. The Automated Neighbor Relations feature minimizes the need for manual configuration of neighbour cell relations and optimization of mobility functions.

The only supported ways of creating the TermPointToENB MO in MORAN on single baseband system is manually and on an incoming X2 Setup Request, remotely initiated by neighbour eNodeB. This is Demanding on network planning (rollout) and needs a lot of signalling.

An object of embodiments herein is to improve the efficiency and performance of providing services to UEs in a wireless communications network According to an aspect of embodiments herein, the object is achieved by a method performed by a first network node. The method is for handling X2-C connection setups in a Multi Operator Radio Access Network, MORAN, system of a wireless communications network. The first network node is operating in the MORAN system.

When receiving an Automatic Neighbour Relation, ANR, initiated report, from the UE, which report comprises one or more identifiers identifying respective one or more neighbouring cells, the first network node unlocks, or creates and unlocks one or more network node termination point Managed Objects, MOs, based on the respective identifier out of the one or more identifiers. and Based on the unlocked, or created and unlocked, one or more network node termination point MOs, the first network node initiates X2-C interface connection setups between the first network node and the respective one or more neighbouring nodes serving the respective identified one or more neighbouring cells. The X2-C interface connections are setup only for only for one X2-C configuration out of all supported X2-C configurations supported on the MORAN system based on the one or more identifiers, and which X2-C interface connections are related to each of the respective one or more neighbouring nodes (112,113)

According to another aspect of embodiments herein, the object is achieved by a first network node configured to handling X2-C connection setups in a Multi Operator Radio Access Network, MORAN, system of a wireless communications network. The first network node is operable in the MORAN system. The first network node is further configured to:

- When receiving an Automatic Neighbor Relation, ANR, initiated report, from the UE, which report comprises one or more identifiers identifying respective one or more neighbouring cells, unlock, or create and unlock one or more network node termination point Managed Objects, MOs, based on the respective identifier out of the one or more identifiers, and
- based on the unlocked, or created and unlocked, one or more network node termination point MOs, initiate X2-C interface connection setups between the first network node and the respective one or more neighbouring nodes serving the respective identified one or more neighbouring cells, which X2-C interface connections are adapted to be setup only for one X2-C configuration out of all supported X2-C configurations on the MORAN system based on the one or more identifiers, and which X2-C interface connections are adapted to be related to each of the respective one or more neighbouring nodes (112,113).

Triggered by ANR initiated report comprising the identifiers of the one or more neighbouring cells, the first network node operating in the MORAN system is capable of initiating only required X2-C connection setups out of all supported X2-C configurations.

Embodiments herein remove the MORAN system limitation, about prevention the system creation of X2-C connections, when the first network node is the X2-C setup initiator.

BRIEF DESCRIPTION OF THE DRAWINGS

Examples of embodiments herein are described in more detail with reference to attached drawings in which.

DETAILED DESCRIPTION

Embodiments herein may relate to securing supported X2-C configurations and required X2-C connections when a network node of a MORAN system, such as a MORAN on single baseband system, is initiator of the X2-C connection setups.

E.g., embodiments herein may relate MORAN on single baseband by providing a method for creation of required X2-C connections.

To secure that resources are not wasted on unnecessary X2-C connections, a method for creation of only required X2-C connections is implemented according to embodiments herein.

According to example embodiments herein, a network node in a MORAN system, e.g. a MORAN on single baseband system, receives an ANR initiated report, e.g. a PCI report, of one or more neighboring cells. The report triggers the network node to create network node termination point MOs related to the one or more neighboring cells, based on identifiers of neighboring cells comprised in the ANR initiated report. The network node then initiates required X2-C connection setup for all Supported X2-C configurations.

A network node termination point MO when used herein e.g., represents a status of an X2-C connection towards another network node.

Figure 1:
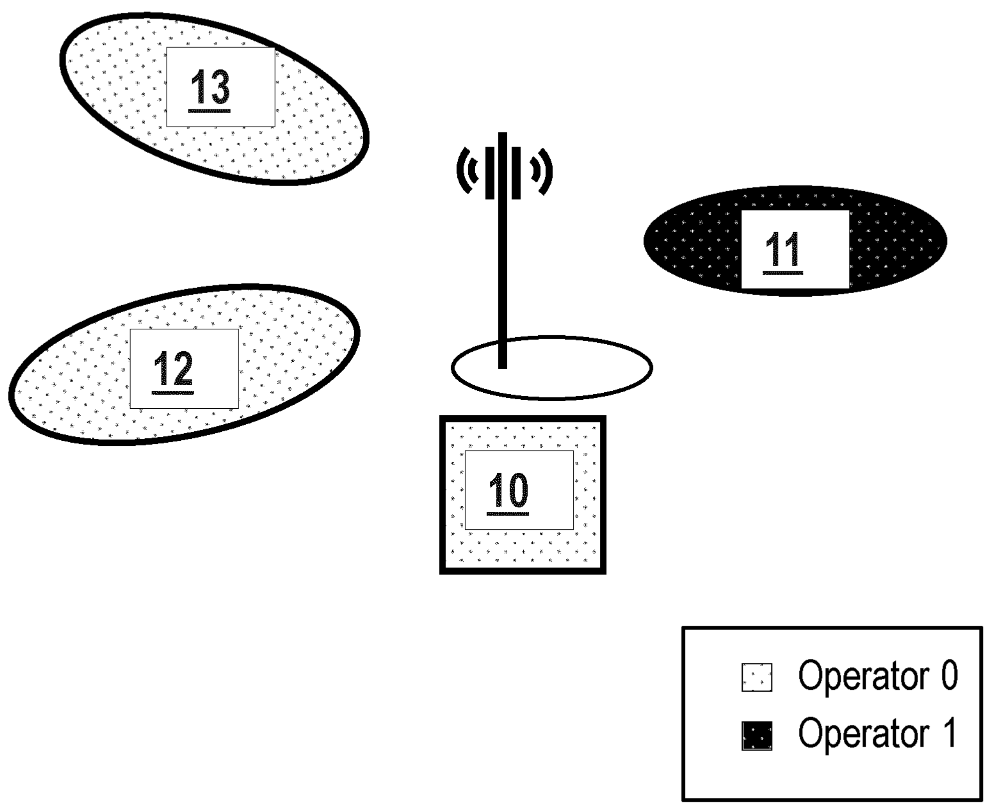
FIG. 1 is a schematic block diagram illustrating prior art.
Figure 2:
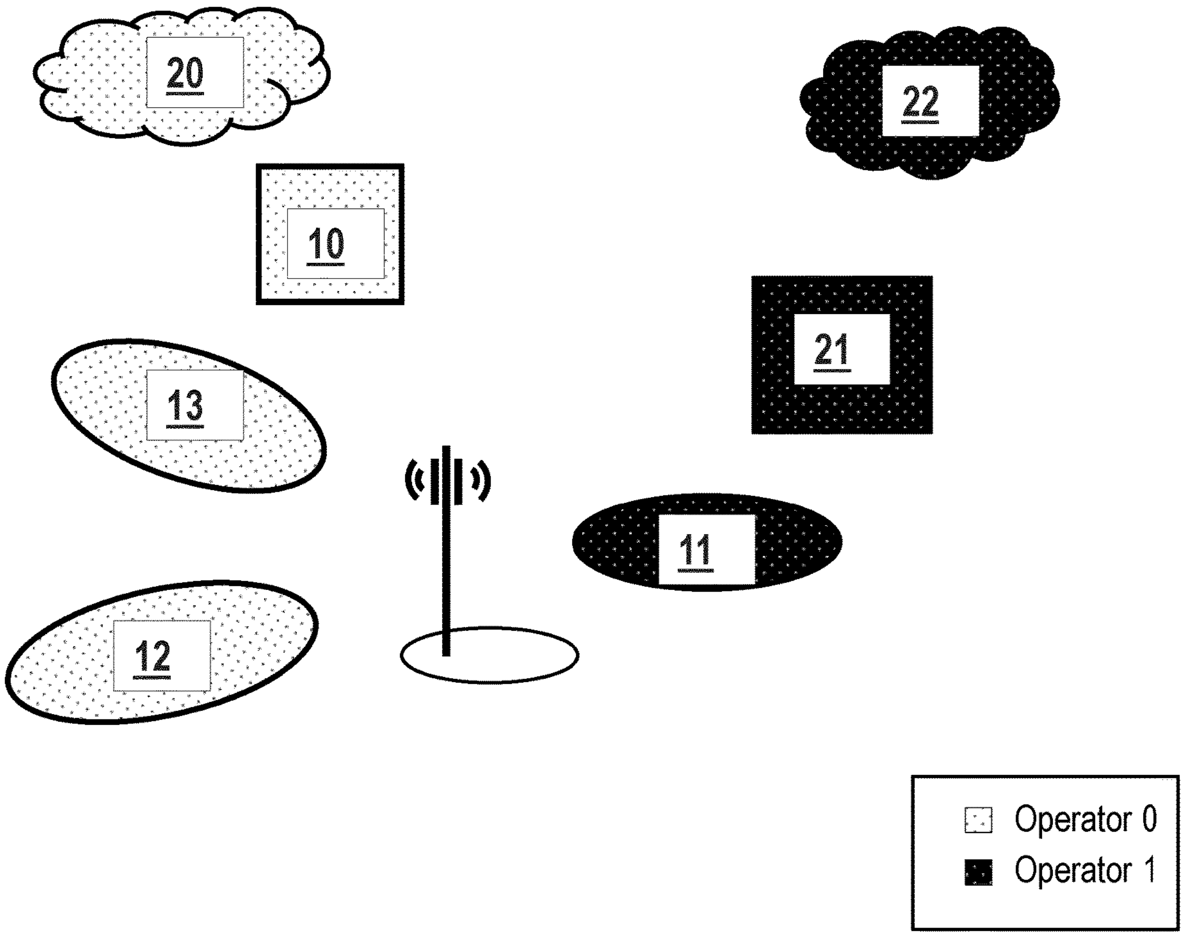
FIG. 2 is a schematic block diagram illustrating prior art.
Figure 3:
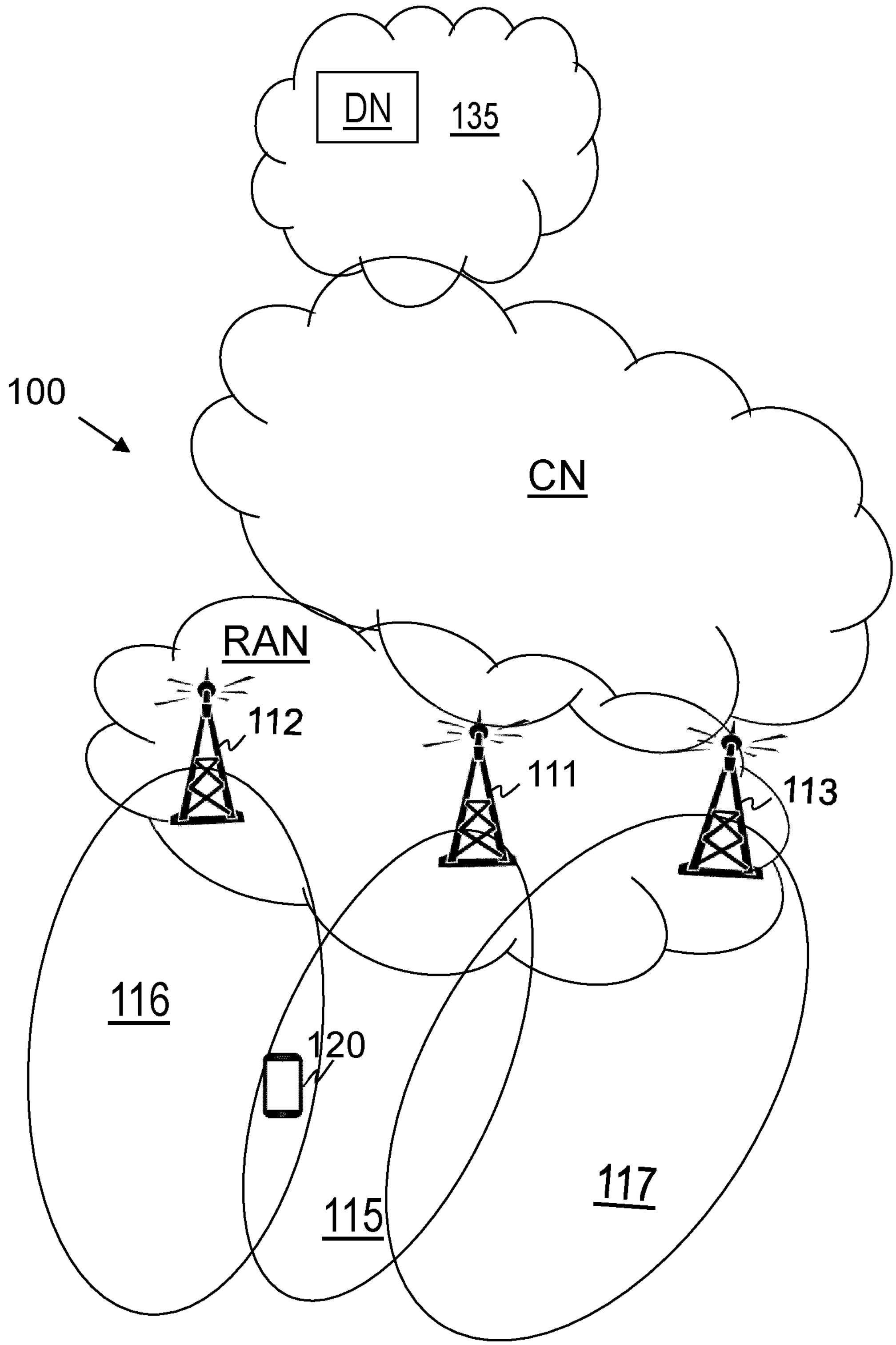
FIG. 3 is a schematic block diagram illustrating embodiments of a wireless communications network.

FIG. 3 is a schematic overview depicting a wireless communications network 100 wherein embodiments herein may be implemented. The wireless communications network 100 comprises one or more RANs and one or more CNs. The wireless communications network 100 may use a number of different technologies, such as mmWave communication networks, Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g., a first network node 111 and one or more neighbouring network nodes 112,113. The network nodes 111, 112,113, each provide radio coverage in one or more cells which may also be referred to as a service area, a beam or a beam group of beams, such as e.g. a first cell 115 served by the first network node 111 and one or more neighbouring cells 116, 117 served by the one or more neighbouring network nodes 112,113.

The first network node 111 and the one or more neighbouring network nodes 112,113, operate in a MORAN system. As mentioned above, the MORAN system is a RAN configuration in which network operators are sharing a network node such as a RAN node, in examples herein operator 0 of a PLMN 0, and operator 1 of a PLMN 1.

The first network node 111 may be associated to a physical first network node 111 and one or more logical first network nodes 111. The physical first network node 111 may be related to, e.g. belongs to, or is owned by, a primary operator referred to as the operator 0, of the PLMN 0.

The logical first network node 111 may be related to, e.g. belongs to, or is owned by a shared operator referred to as the operator 1, of the PLMN 1.

The one or more neighbouring network nodes 112, 113, may be related to, e.g. belongs to, or is owned by the primary operator 0 of the PLMN 0.

The cells 115, 116 provided by the one or more neighbouring network nodes 112,113, may be shared cells, shared between primary operator 0 and shared operator 1 according to the MORAN system.

A neighbouring network node 112,113 when used herein means a network node that is neighbor to, e.g. near, or close to the first network node 111. A neighbouring cell 116, 117 when used herein means a cell that is neighbor to, e.g. near, the first cell 115. Each of the first network node 111 and one or more neighbouring network nodes 112,113, referred to as the network nodes 111, 112, 113, may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, an NG-RAN node, a base transceiver station, a radio remote unit, an Access Point Base Station, a base station router, a transmission arrangement of a radio base station, a stand-alone access point or any other network unit capable of communicating with UEs such as e.g. a UE 120, within the respective cells 11, 12, served by the network nodes 111, 112,113 depending e.g. on the first radio access technology and terminology used. Any of the network nodes 111, 112,113 may communicate with UEs such as the UE 120, in DL transmissions to the UEs and in UL transmissions from the UEs.

A number of UEs operate in the wireless communication network 100, such as e.g. a UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g., smart phone, laptop, mobile phone, sensor, relay, mobile tablets or even a small base station communicating within a cell.

The UE 120 may e.g. be served by the first network node 111, in the first cell 115. The UE 121 may further e.g. be served by any of the neighbouring network nodes 112, 113, in the respective neighbouring cells 116, 117.

Methods herein may be performed by the first network node 111. As an alternative, a Distributed Node (DN) and functionality, e.g. comprised in a cloud 135 as shown in FIG. 3, may be used for performing or partly performing the methods herein.

A number of embodiments will now be described, some of which may be seen as alternatives, while some may be used in combination.

Figure 4:
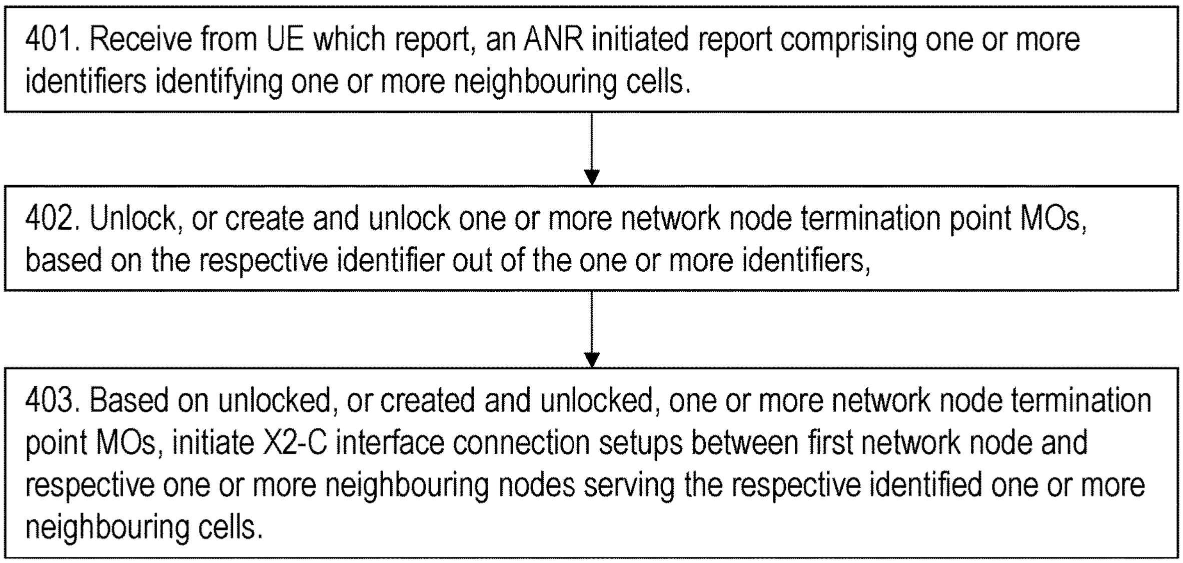
FIG. 4 is a flowchart depicting an embodiment of a method in a first network node.

FIG. 4 shows example embodiments of a method performed by the first network node 111. The method is for handling X2-C connection setups in a MORAN system of the wireless communications network 100. The first network node 111 is operating in the MORAN system. In some embodiments, the MORAN system is represented by a MORAN on single baseband system.

The method comprises the following actions, which actions may be taken in any suitable order. Optional actions are referred to as dashed boxes in FIG. 4.

Action 401

The first network node 111 receives an ANR initiated report from the UE 120. The report comprises one or more identifiers identifying respective one or more neighbouring cells 116, 117. An ANR initiated report when used herein e.g., means a report received in the first network node 1111 from the UE 120 upon request from an ANR function in the first network node 111. Event-based ANR measurements may provide reports from the UE 120 before mobility measurements are triggered. Over time, a specified number of selected UEs, e.g. comprising the UE 120, are ordered to report PCI and subsequently to report CGI.

In some embodiments, the identifiers are represented by respective Physical Cell Identifiers, PCIs. A PCI when used herein e.g., means the Physical Cell Identity of a cell. A cell identifier on the physical layer may be used to indicate a physical layer identity of the cell. The PCI is used as a cell identity during a cell selection procedure.

Action 402

When receiving the ANR initiated report from the UE 120, the first network node 111 unlocks, or creates and unlocks one or more network node termination point MOs based on the respective identifier out of the one or more identifiers comprised in the ANR initiated report. This may e.g., mean that the first network node 111 creates and unlocks a network node termination point MOs for each of the respective identified one or more neighbouring network nodes 112, 113. This may also e.g., mean that if network node termination point MOs are already created, the first network node 111 unlocks the network node termination point MOs for each of the respective identified one or more neighbouring network nodes 112,113.

The creation of a network node termination point MO may be performed by the first network node 111 automatically by using the applicable identifiers in the received ANR report.

In some embodiments, the network node termination point MOs are represented by termination point to the neighbouring nodes 112, 113, MOs. These may be referred to as neighbouring node termination MOs.

The unlocking, or creating and unlocking, of the one or more network node termination point MOs may be performed when a match is found related to the MORAN system, of one or more PLMN Identifiers (IDs) of a first cell 115 provided by the first network node 111, with one or more active PLMN Ids of the one or more neighbouring cells 116,117. The match is checked e.g., for the purpose of required X2-C connection setup since it's only useful to add neighbouring network nodes that are serving neighbouring cells that the UE 121 of that particular PLMN identifier can use in order to get radio coverage.

The one or more identifiers identifying the respective one or more neighbouring cells 116,117, may comprise the one or more active PLMN Ids of the one or more neighbouring cells 116, 117. A PLMN ID of a cell identifies where in the network the UE 120 can get radio coverage.

A PLMN ID is an ID that globally identifies a mobile operator. It is a combination of MCC (Mobile Country Code) and MNC (Mobile Network Code).

This will be described and exemplified more in detail below.

Action 403

Based on the unlocked, or created and unlocked, one or more network node termination point MOs, the first network node 111 initiates X2-C interface connection setups. The X2-C interface connection setups are between the first network node 111 and the respective one or more neighbouring nodes 112, 113, serving the respective identified one or more neighbouring cells 116,117.

The X2-C interface connections are setup only for one X2-C configuration. This one X2-C configuration is one out of all supported X2-C configurations A, B, C on the MORAN system based on the one or more identifiers. The X2-C interface connections are related to each of the respective one or more neighbouring nodes 112, 113. Which one X2-C configuration out of all supported X2-C configurations A, B, C on the MORAN system is to select to be used is based on the one or more identifiers.

In some embodiments, wherein the all Supported X2-C configurations A, B, C on the MORAN system, related to each of the respective one or more neighbouring nodes 112, 113, comprise any one or more configuration out of:

The configuration A comprises any MORAN on single baseband network node towards a dedicated neighbouring network node of the same or another vendor. A dedicated neighbouring network node when used herein e.g., means a neighbouring network node which requires only one X2-C connection from the local system. A neighbouring network node of another vendor means another vendor than the vendor of the first network node.

The configuration B comprises any MORAN on single baseband network node towards a shared neighbouring network node of the same or other vendor of the same or other vendor, or neighbouring network node of another vendor with a shared Multi Operator Core Network (MOCN) cell.

The configuration C comprises any MORAN on single baseband network node towards another MORAN operating network node, e.g., MORAN on single baseband neighbouring network node.

In these embodiments, the first network node 111 is represented by the MORAN on single baseband network node, and In these embodiments, the one or more neighbouring network nodes 112, 113, are represented by any one or more out of: A the dedicated neighbouring network node or the neighbouring network node of the other vendor, B the shared neighbouring network node, or another vendor neighbouring network node with a shared MOCN cell, and/or C another MORAN on single baseband neighbouring network node.

The initiating of the X2-C interface connection setups between the first network node 111 and the respective one or more neighbouring nodes 112, 113, may comprise sending a X2-C connection setup request to the one or more neighbouring nodes 112,113.

The below examples relate to eNodeBs, but embodiments herein also relate to gNodeBs or similar.

FIGS. 5*a*, 5*b*, 5*c* and 5*d* all depict as a physical node 510 associated to the first network node 111 and belonging to, e.g. owned by, a primary operator 0. The physical node 510 of the operator 0 is assigned a Global ENB ID being: plmn0+ and eNB ID 0. The node 510 comprises a node defined primary PLMN of plmn0 belongining to the first network node 111.

The physical node 510 may further provide a Shared Cell 513. The Shared Cell 513 comprises a node defined primary PLMN of plmn0 belonging to the primary operator 0, and an additional PLMN of operator 3, plmn3. The Shared Cell 13 comprises a SIB 1 of plmn0 and a SIB 1 of plmn3.

The physical node 510 is connected to a CN 520 of plmn0, owned by the operator 0, over an S1-C interface.

Further a MORAN cell 511 is represented by a logical network node 521 associated to the first network node 111. The logical node 521 is connected to a CN 522 of plmn1, owned by the operator 1, over an S1-C interface. The logical node 521 is assigned a Global eNB ID of plmn1 and a an eNB ID 0. The Cell defined primary PLMN is plmn1.

Figure 5A:
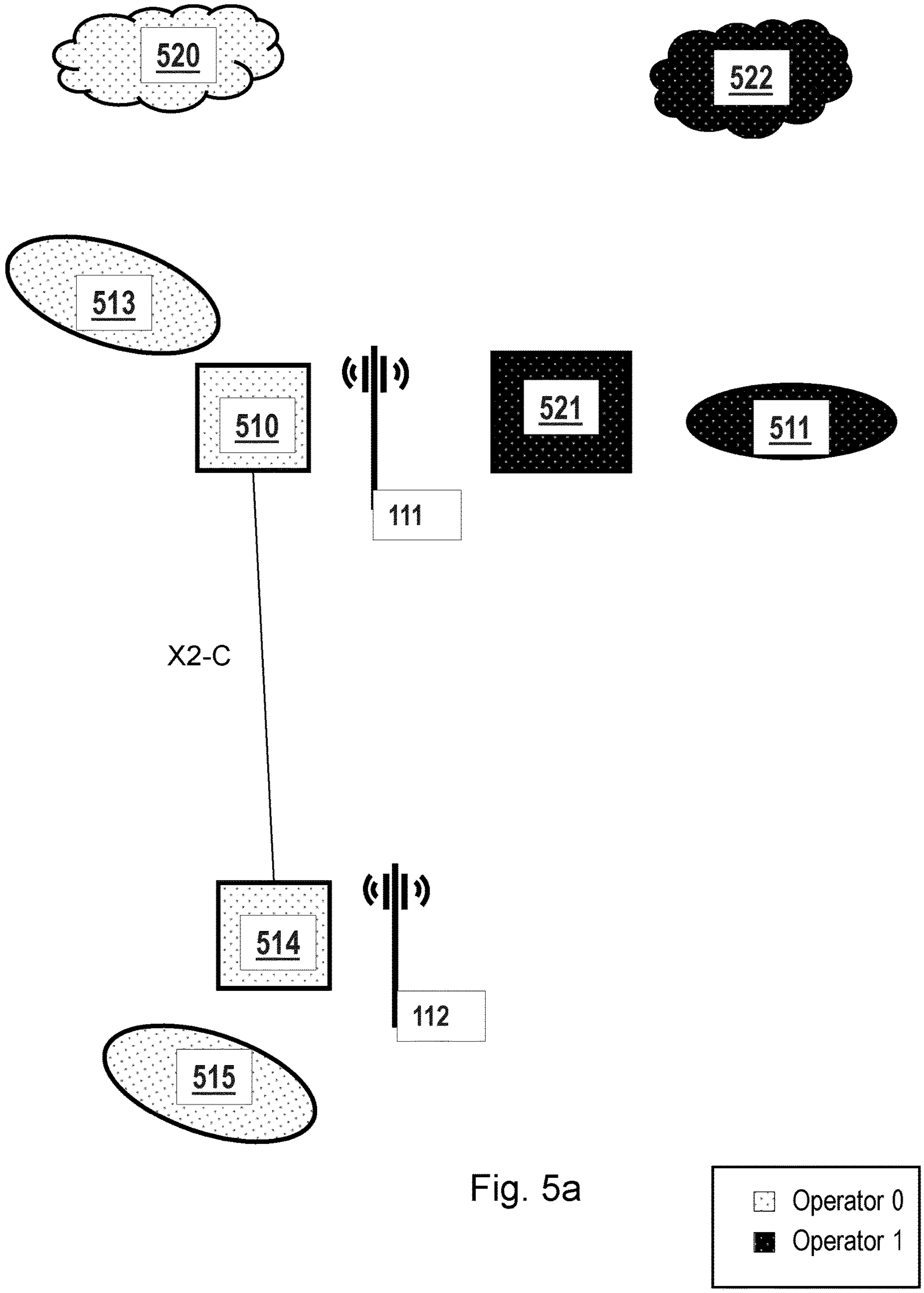
FIGS. 5 *a-d* are a schematic block diagrams illustrating example different embodiments.

An example of the configuration A scenario is depicted in FIG. 5*a*. FIG. 5*a* illustrates a configuration A scenario wherein the node 510 comprising a node defined primary PLMN ID of the first network node 111, establishes a X2-C connection to a neighbor node 514 of the neighbouring network node 112, due to matching broadcasted PLMN IDs in neighboring network node cell 515 provided by the neighbor node 514, and local serving cell 513 provided by the node 510 of the first network node 111.

Figure 5B:
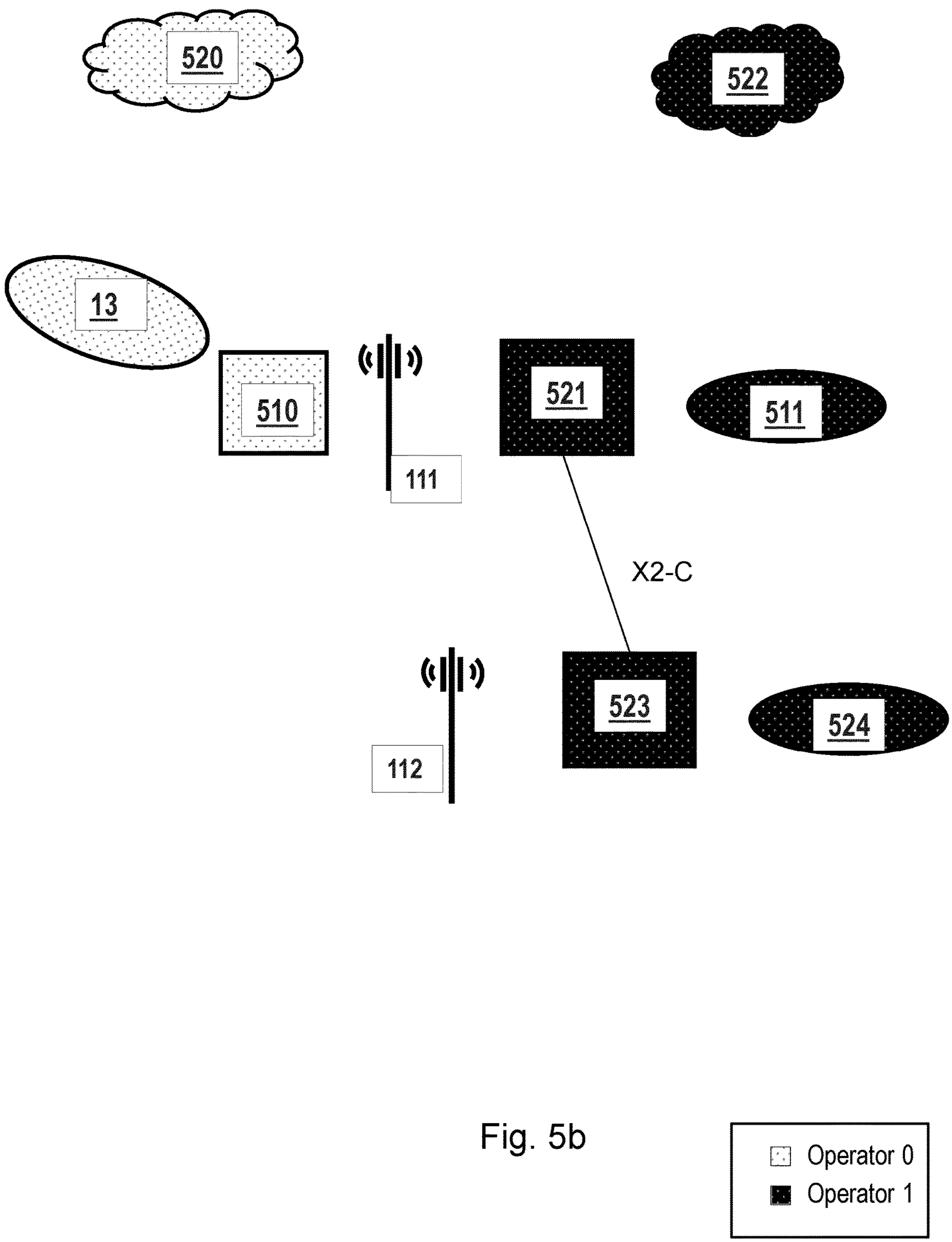

Another example of the configuration A scenario is depicted in FIG. 5*b*. FIG. 5*b* illustrates a configuration A scenario wherein a node 521, with logical primary PLMN ID of the first network node 111, establishes a X2-C connection to a neighbor node 523 of the neighbouring network node 112, due to matching broadcasted PLMN IDs in neighboring network node cell 524 provided by the neighbor node 523 and local serving cell 511 provided by the node 521 of the first network node 111.

Figure 5C:
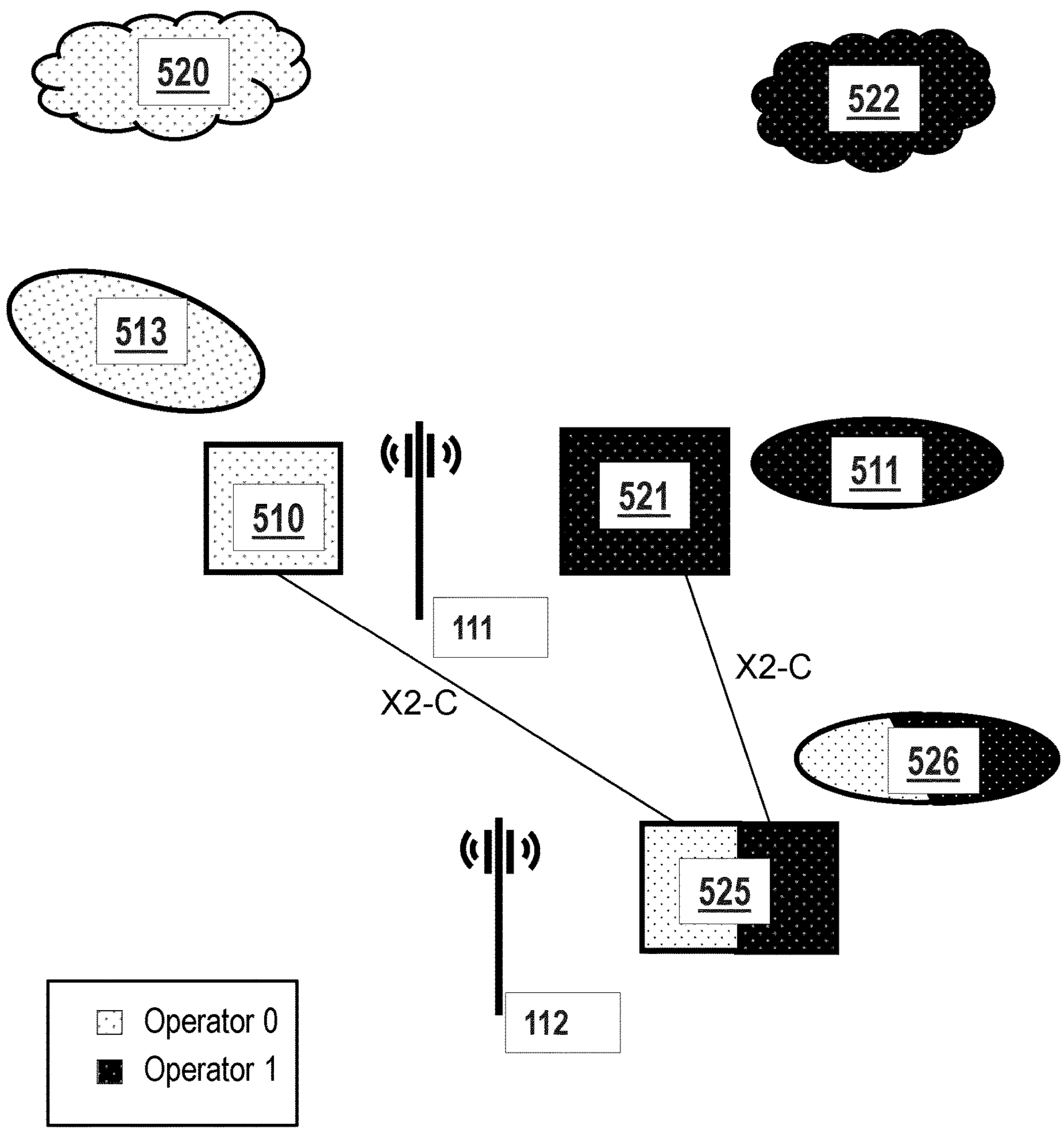

An example of the configuration B scenario is depicted in FIG. 5*c*. FIG. 5*c* illustrates a configuration B scenario wherein a node 521 of the first network node 111 establishes one X2-C connection to neighbor node 525 of the neighbouring network node 112, due to matching broadcasted PLMN IDs in neighboring network node cell 526 provided by the neighbor node 525 of the neighbouring network node 112, and local serving cell 511 provided by the node 521 of the first network node 111.

Further, the node 510 of the first network node 111 establishes X2-C connection to the neighbor node 525 of the neighbouring network node 112, due to matching broadcasted PLMN IDs in neighboring network node cell 526 provided by the neighbor node 525 of the neighbouring network node 112 and local serving cell 513 provided by the node 510 of the first network node 111.

Figure 5D:
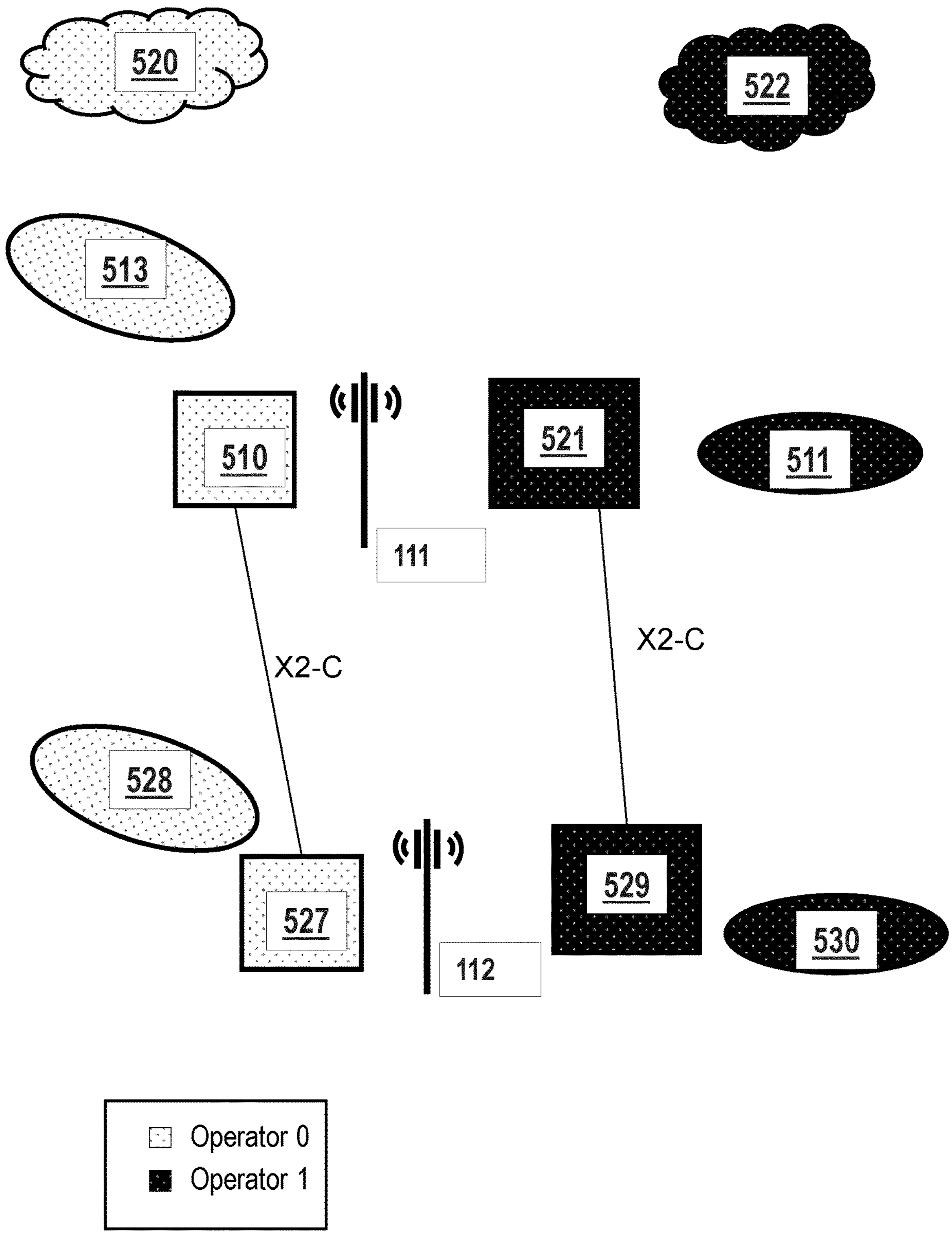

An example of the configuration C scenario is depicted in FIG. 5*d*.

FIG. 5*c* illustrates a configuration C scenario wherein the node 521 of the first network node 111, with logical primary PLMN ID of the first network node 111, establishes a X2-C connection to a neighbor node 529 of the neighbouring network node 112, due to matching broadcasted PLMN IDs in neighboring network node cell 530 provided by the neighbor node 529 of the neighbouring network node 112 and local serving cell 511 provided by the node 521 of the first network node 111.

And/or the node 510 of the first network node 111, with node defined primary PLMN ID of the first network node 111, establishes a X2-C connection to neighbor node 527 of the neighbouring network node 112, due to matching broadcasted PLMN IDs in neighboring network node cell 528 provided by the neighbor node 527 of the neighbouring network node 112 and local serving cell 513 provided by the node 510 of the first network node 111.

An advantage with using the network node termination point MO to initiate the X2-C interface connection setups between the first network node 111 and the respective one or more neighbouring nodes 112,113 according to the embodiments herein, is that resources are not wasted on unnecessary X2-C connections. According to the embodiments herein, only required X2-C connections are created.

The above embodiments will now be further explained and exemplified below. The embodiments below may be combined with any suitable embodiment above.

The first network node 111 receives an ANR initiated report from the UE 120. The report comprises one or more identifiers identifying respective one or more neighbouring cells 116, 117. The ANR initiated report of the neighboring cells 116, 117 is received by the first network node 111 operating in the MORAN system, e.g. the MORAN on single baseband system. The ANR initiated report may e.g. be a PCI report.

This is related to and may be combined with Action 401 described above.

When the ANR initiated PCI report of the neighboring cells 116, 117 is received in the MORAN system, the first network node 111 unlocks, or creates and unlocks one or more network node termination point MOs based on the respective identifier out of the one or more identifiers. The network node termination point MOs may be local system representations of X2-C links towards neighboring nodes 112, 113.

This is related to and may be combined with Action 402 described above.

As mentioned above, in some embodiments the unlocking, or creating and unlocking of the one or more network node termination point MOs may be performed when a match is found related to the MORAN system. That is seeking a match of one or more PLMN IDs of the first cell 115 provided by the first network node 111, with one or more active PLMN Ids of the one or more neighbouring cells 116, 117.

For example, when the first network node 111 operating in the MORAN system is about to unlock or create and unlock, the network node termination point MOs related to the neighboring network nodes 112, 113, it will check for the match of the PLMN IDs of the first cell 115, that in this example is the source cell, with active PLMN IDs of the one or more neighbouring cells 116, 117, that in this example is the target cell.

A source cell and a target cell when used herein relate to the source cell is served by the first network node and the target cell is served by a neighbouring network node. When a UE is moving from a source cell to a target cell, the radio coverage can be maintained for the UE.

Source cell—cell belonging to the local (first, 111) network node

Target cell—cell belonging to neighbor eNodeB

Example 1 of some embodiments herein, relate to a scenario where all X2-C configurations A, B, and C are supported.

If a PLMN ID match is found, the first network node 111 will further check whether the matched PLMN ID further equals the primary PLMN ID of the first network node 111, e.g. physical eNodeB primary PLMN ID related to the MORAN system, or any of the first cell's 115 additional PLMN IDs related to the MORAN system.

These matches are required before the creation and unlock of the network node termination point MOs to be able to only create required X2-C connections. If there is a match, it means that the primary operator 0 serves a cell that can be a source cell towards the target cell as given in the report. If there is no match with the physical eNodeB primary PLMN ID, the first network node 111 will further check whether there is a match with the PLMN ID of any sharing operator, meaning that the sharing operator e.g. operator 1 serves a cell that can be a source cell towards the target cell as given in the report.

So, if the match is found that equals the physical primary PLMN ID of the first network node 111 in the further check, the first network node 111 will unlock if already created, or create and unlock if not already created, the network node termination point MOs related to the neighboring network nodes112, 113, for example TermPointToENB MOs.

This is related to and may be combined with Action 402 described above.

As mentioned above, based on the unlocked, or created and unlocked one or more network node termination point MOs, the first network node 111 will initiate X2-C interface connection setups between the first network node 111 and the respective one or more neighbouring nodes 112, 113 serving the respective identified one or more neighbouring cells 116, 117. The X2-C interface connections are setup only for all Supported X2-C configurations related to each of the respective one or more neighbouring nodes 112, 113. E.g. all X2-C configurations that are supported, which e.g. may be any one or more out of the X2-C configuration A, the X2-C configuration B, and/or the X2-C configuration C, as mentioned above.

The network node termination point MOs may be unlocked, or created and unlocked, with a reference to the physical first network node 111 from which the X2-C shall be setup. E.g. With the reference to X2-C SctpEndpoint appointed to the first physical network node 111.

An am Control Transmission Protocol (SCTP) endpoint is an SCTP designated packet sender or receiver with eligible combined and unique transport addresses. SCTP enables single endpoint capability for multiple Internet Protocol (IP) addresses known as multi-homing.

X2-C interface connections are setup for only a required X2C configuration out of the X2-C configurations A, B and C on the MORAN system that are supported by the first network node 111 using the MORAN system, e.g. the MORAN on Single Baseband configuration. There are no requirements for neighbouring nodes of the neighbouring network nodes 112, 113 for this kind of configuration. From neighbouring nodes perspective physical and logical nodes are represented with separate ExternalENBFunction.

As mentioned above:

Configuration A) X2-C interface connections are setup from the first network node 111 operating in the MORAN system towards each of the one or more neighboring network nodes 112, 113 that in this case are represented by legacy dedicated network nodes, e.g. eNodeBs, and/or other vendor operators network nodes, e.g. eNodeBs.

Configuration B) X2-C interface connections are setup from the first network node 111 operating in the MORAN system towards each of the one or more neighboring network nodes 112, 113 that in this case are represented by legacy network nodes e.g. eNodeBs, and/or other vendor operators network nodes, e.g. eNodeBs, with MOCN cells.

Configuration C) X2-C interface connections are setup from the first network node 111 operating in the MORAN system towards each of the one or more neighboring network nodes 112, 113 that in this case are represented by other network nodes operating in the MORAN system, e.g., the MORAN on single baseband system.

X2-C connection setup requests may be sent to the neighboring network nodes 112, 113 from the X2-C SctpEndpoint0 belonging to the physical first network node 111, e.g. with a filtered content of a message e.g. comprising a global eNB ID of the physical node 510 of the first network node 111, served cells information of the cells 115 served by the first network node 111 with the primary PLMN ID equal to the physical node primary PLMN ID, e.g. for PLMN 0, and/or a Global Unique Group ID (GUGI).

This is related to and may be combined with Action 403 described above.

Example 2 of some embodiments herein, relate to a scenario where only X2-C configuration B is supported.

If a PLMN ID match is found, the first network node 111 will further check whether the matched PLMN ID further equals the logical primary PLMN ID of the first network node 111, e.g. logical node 521 primary PLMN ID related to the MORAN system. This match is required before the creation and unlock of the network node termination point MOs to be able to set up only the required X2-C connection.

So, if the match is found in the further check, the first network node 111 will unlock if already created, or create and unlock if not already created, the network node termination point MOs related to the neighboring network nodes112, 113, for example TermPointToENB MOs.

This is related to and may be combined with Action 402 described above.

The network node termination point MOs may be unlocked, or created and unlocked, with a reference to the logical first network node 111 from which the X2-C shall be setup. E.g. with reference to X2-C SCTP endpoint of the sharing operator 1 (Sctp Endpoint1) related to the logical node of the first network node 111. This is to secure required X2-C connection setup.

X2-C interface connections are only setup for all supported X2-C configurations on the MORAN system, which in this case is X2-C configuration B comprising X2-C connections towards a neighboring network node 112, 113 with a shared MOCN cell 116, 117.

The X2-C connection setup requests may be sent to the neighboring network nodes 112, 113 from the X2-C SctpEndpoint1 belonging to the logical first network node 111, for example, with a filtered content of a message e.g. comprising a global eNB ID of the logical first network node 111, served cells information of the cells 115 served by the logical first network node 111 with the primary PLMN ID equal to the logical eNodeB primary PLMN ID, i.e. providing the MORAN cell, e.g. for PLMN 1 and/or a Global Unique Group ID (GUGI).

This is related to and may be combined with Action 403 described above.

If no match is found, no network node termination point MOs related to the neighboring network nodes112, 113 will be unlocked, nor created and unlocked.

FIGS. 5*a-c* depict an example of the method according to some embodiments herein. FIGS. 5*a-c* illustrate a MORAN system, such as a MORAN on single baseband system, algorithm for creation and securing supported X2-C configurations and required X2-C connections.

Figure 6A:
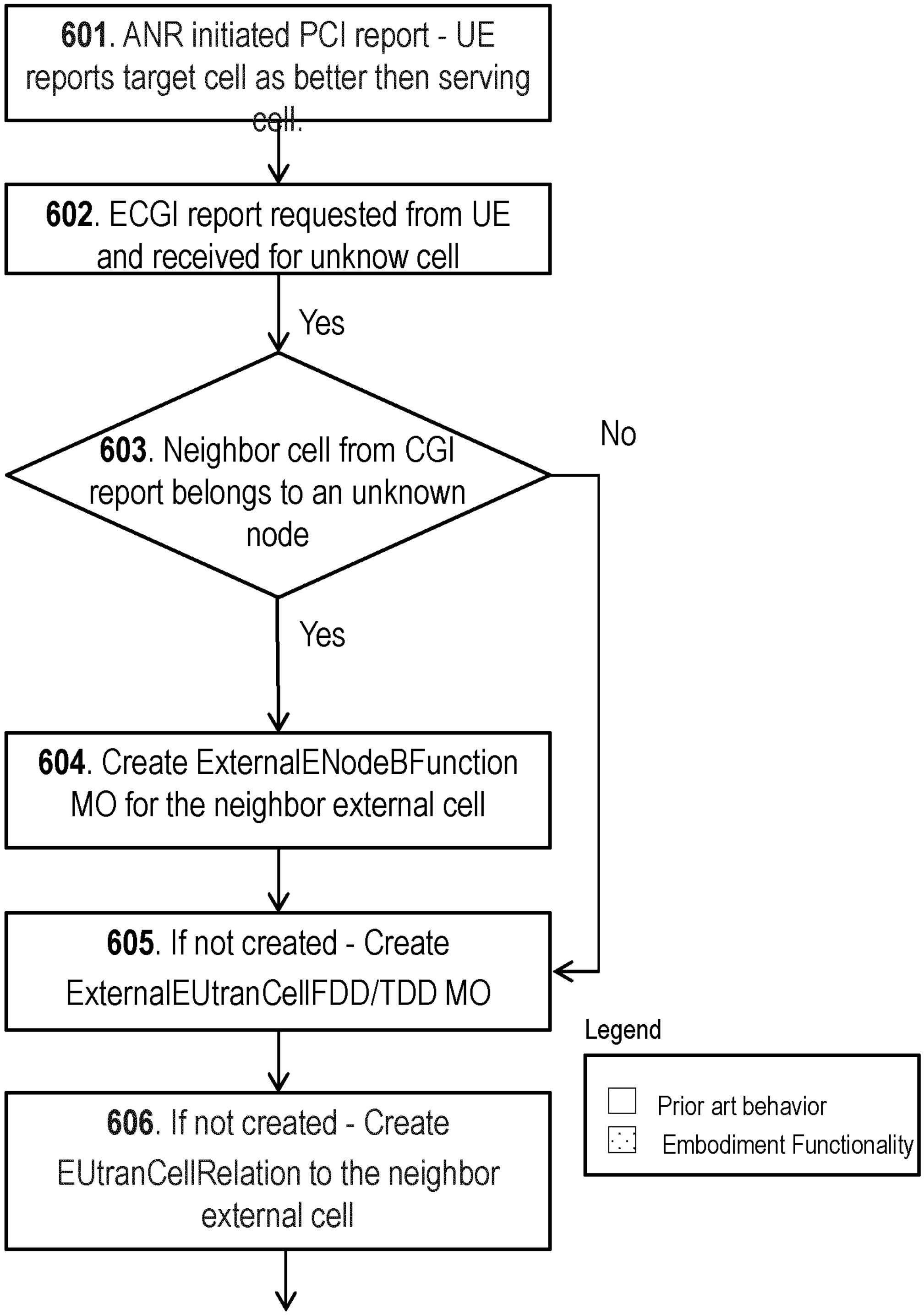
FIGS. 6 *a-c* are a schematic flowcharts illustrating example embodiments of a method.
Figure 6B:
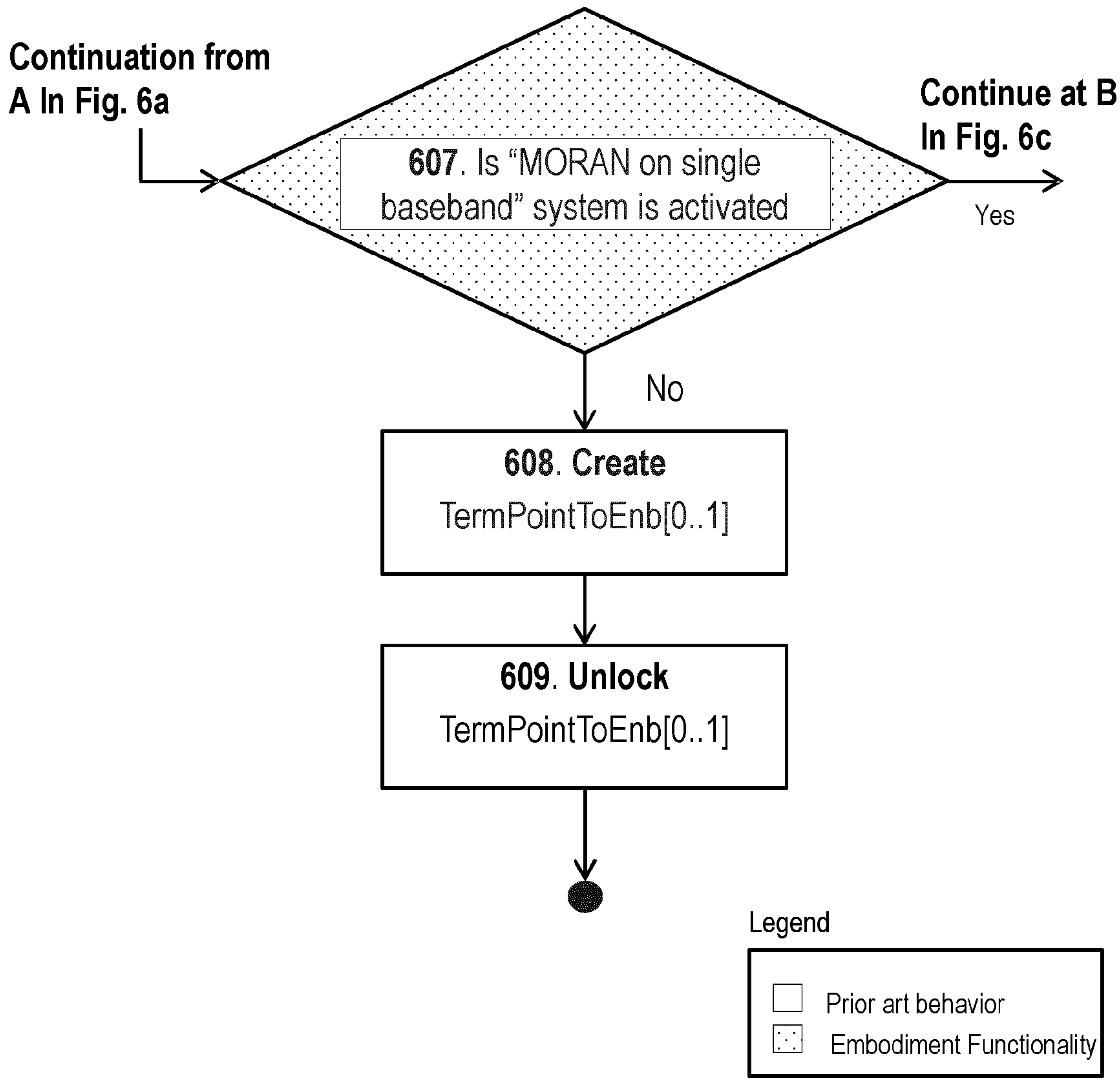
Figure 6C:
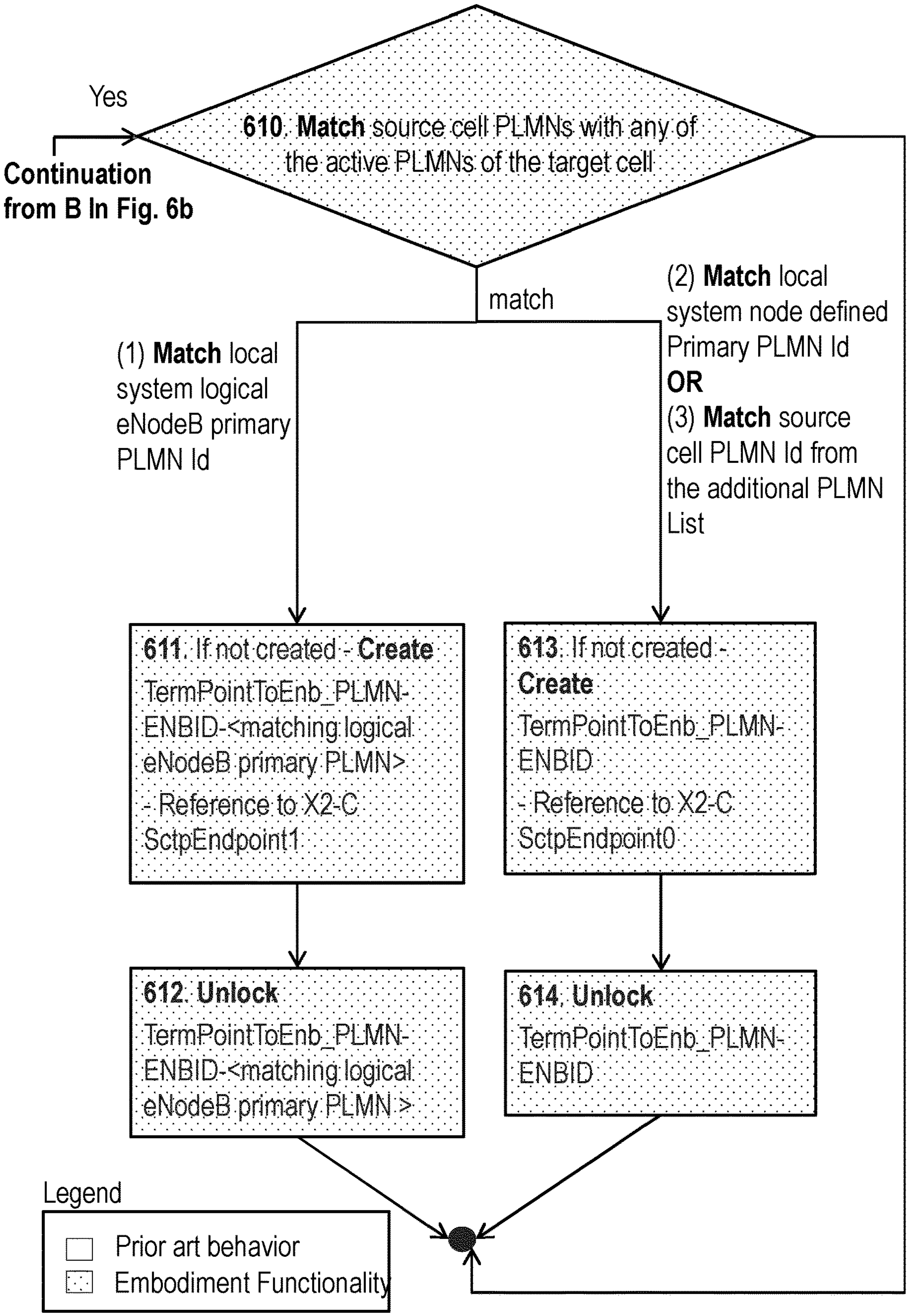

FIG. 6*a* depicts the Actions 601-606, FIG. 6*b* depicts the Actions 607-609, and FIG. 6*c* depicts the Actions 510-514. It should be noted the following example is described in terms of LTE. However, as mentioned above, embodiments herein may relate to 4G, 5G or any future generation of the wireless communications system 100. The terminations of the algorithm are referred to as black spots in the FIGS. 6*a*-6*c*.

The first network node 111 receives 601 an ANR initiated PCI report, the UE 120 reports the neighbouring cell 116, here the target cell, as better than the first cell 115, here the serving cell. The UE 120 connected to the first node cell 115, here the source cell, reports the neighbouring node cell. This is related to and may be combined with Action 401 described above.

The first network node 111 requests 602 and receives an Evolved Universal mobile telecommunications system Terrestrial Radio Access Network (E-UTRAN) Cell Global Identifier (ECGI) report from UE and received for the neighbouring cell 12, here, an unknown cell.

The first network node 111 checks 603 if the neighboring cell 12 from the ECGI report belong to an unknown node.

If yes, the neighboring cell 12 from the ECGI report belong to an unknown node, the first network node 111 creates 604 a network node termination point MO, in this example, an ExternalENBFunction, also referred to as ExternalENodeBFunction MO, for the neighbor external cell 12.

If not created the first network node 111 creates 605 a cell termination point MO here an external E-Utran Cell Frequency Division Duplex (FDD)/Time Division Duplex (TDD) MO (ExternalEUtranCellFDD/TDD MO).

If no, the neighboring cell 12 from the ECGI report does not belong to an unknown node, and if not created, the first network node 111 creates 606 an E-UTRAN Cell relation (EUtranRelation, also referred to as EUtranCellRelation) to the neighbor external cell 12.

The Method is Continued at A in FIG. 6*b*.

The first network node 111 checks 607 if the MORAN system, e.g. the MORAN on single baseband system, is activated. This may be performed by This check enables creation of term points for A, B or C scenarios.

If no, the MORAN system, such as e.g. the MORAN on single baseband system, is not activated, the first network node 111 creates 608 a network node termination point MO, in this example, a termination point to eNB [0 . . . 1] (TermPointToEnb [0 . . . 1]) wherein [0 . . . 1] is the representation of maximum number of termination points.

The first network node 111 then Unlocks 609 the TermPointToEnb [0 . . . 1].

The first network node 111 then initiates X2-C interface connection setups between the first network node 111 and the neighbouring node 112, based on the unlocked, or created and unlocked network node termination point MO.

If yes, the MORAN system is activated, the method is continued at B in FIG. 6*c*.

So, if yes, the MORAN system is activated, the first network node 111 tries to match 610 the first network node 11 first cell 115 PLMNs, here source cell PLMNs, with any of the active PLMNs of the neighboring node cell 116, here the target cell.

A local system logical eNodeB primary PLMN when used herein means Primary PLMN Id of the MORAN cell. If there is a matching (1) of a local system logical eNodeB primary PLMN Id, and if not created, the first network node 111 creates 611 a network node termination point MO, in this example a (TermPointToEnb_PLMN-ENBID) matching a logical eNodeB primary PLMN, with Reference to X2-C SctpEndpoint1. This means that Created termination point establishes sctp association with referenced local sctp endpoint 1 and on top of it X2-C connection.

The first network node 111 unlocks 612 the network node termination point MO, in this example the TermPointToEnb_PLMN-ENBID that is matching logical eNodeB primary PLMN.

This is related to and may be combined with Action 402 described above.

The first network node 111 then initiates X2-C interface connection setups between the first network node 111 and the neighbouring node 112, based on the unlocked, or created and unlocked network node termination point MO. This is referred to as a black spot In FIG. 6*c*. This is related to and may be combined with Action 403 described above.

A local system node defined Primary PLMN when used herein e.g. means a Physical first network node primary PLMN Id.

If there is a matching (2) of a local system node defined Primary PLMN Id, or a matching (3) of a source cell PLMN Id from the additional PLMN List, and if not created, the first network node 111 creates 613 a network node termination point MO, in this example a TermPointToEnb_PLMN-ENBID with reference to X2-C SctpEndpoint0. This means that the Created termination point establishes sctp association with referenced local sctp endpoint 0 and on top of it X2-C connection.

The first network node 111 unlocks 614 the network node termination point MO, in this example the TermPointToEnb_PLMN-ENBID.

This is related to and may be combined with Action 402 described above.

The first network node 111 then initiates X2-C interface connection setups between the first network node 111 and the neighbouring node 112, based on the unlocked, or created and unlocked network node termination point MO. This is related to and may be combined with Action 403 described above.

To perform the method actions above, the first network node 111 is configured to handling X2-C connection setups in a MORAN system of a wireless communications network 100. The first network node 111 is operable in the MORAN system. The MORAN system may be adapted to be represented by a MORAN on single baseband system.

Figure 7A:
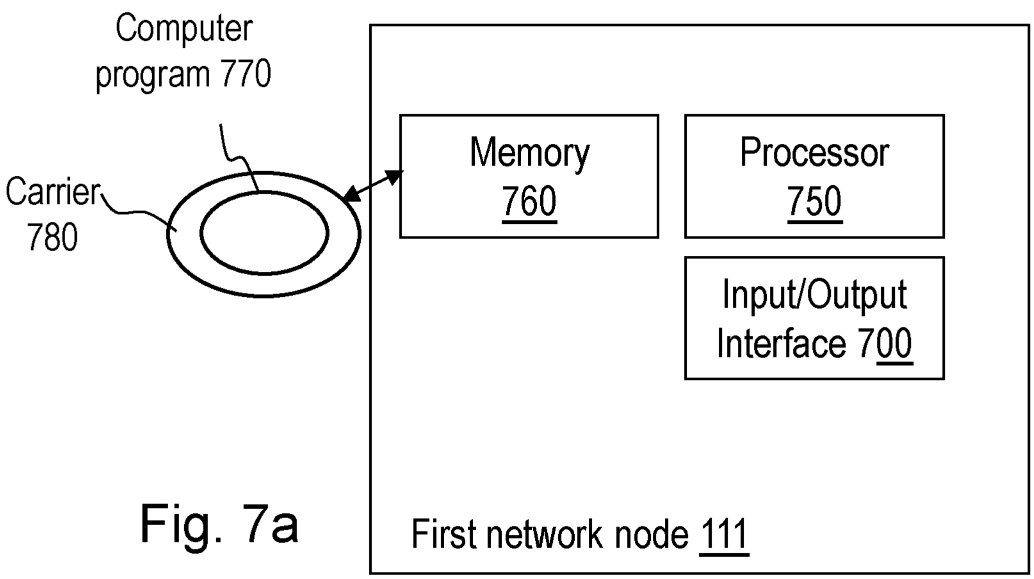
FIGS. 7 *a* and *b* are schematic block diagrams illustrating embodiments of a first network node.
Figure 7B:
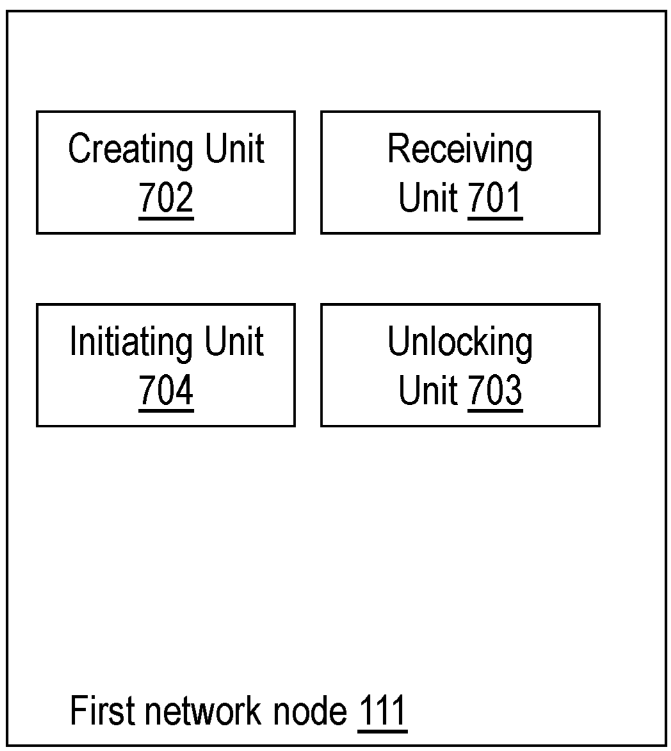

The first network node 111 may comprise an arrangement depicted in FIGS. 7*a* and 7*b*.

The first network node 111 may comprise an input and output interface 700 configured to communicate in the wireless communication network 100, e.g., with any one or more out of the neighbouring network nodes 112, 113, and the UE 120. The input and output interface 700 may comprise a wireless receiver (not shown) and a wireless transmitter (not shown).

The first network node 111 is further configured to, e.g. by means of a receiving unit 701 in the first network node 111, receive an ANR initiated report from the UE 120, which report comprises one or more identifiers identifying respective one or more neighbouring cells 116,117.

The first network node 111 may further be configured to, e.g. by means of a creating unit 702 in the first network node 111, create one or more network node termination point MOs based on the respective identifier out of the one or more identifiers when receiving the ANR initiated report from the UE 120.

The first network node 111 may further be configured to, e.g. by means of an unlocking unit 703 in the first network node 111, 117, unlock one or more network node termination point MOs based on the respective identifier out of the one or more identifiers, when receiving the ANR initiated report from the UE 120.

The first network node 111 may further being configured to, e.g. by means of the creating unit 702 and/or the unlocking unit 703, in the first network node 111, 117, perform the unlocking, or creating and unlocking, of the one or more network node termination point MOs when a match is found related to the MORAN system, of one or more PLMN IDs of a first cell 115 provided by the first network node 111, with one or more active PLMN Ids of the one or more neighbouring cells 116, 117.

The first network node 111 may further be configured to, e.g. by means of an initiating unit 704 in the first network node 111, 117, based on the unlocked, or created and unlocked one or more network node termination point MOs, initiate X2-C interface connection setups between the first network node 111 and the respective one or more neighbouring nodes 112,113, serving the respective identified one or more neighbouring cells 116, 117. The X2-C interface connections are adapted to be setup only for one X2-C configuration out of all supported X2-C configurations (A, B, C) on the MORAN system based on the one or more identifiers. The X2-C interface connections are related to each of the respective one or more neighbouring nodes 112, 113.

The first network node 111 may further be configured to, e.g. by means of the initiating unit 704 in the first network node 111, 117, initiate the X2-C interface connection setups between the first network node 111 and the respective one or more neighbouring nodes 112, 113, by further sending a X2-C connection setup request to the one or more neighbouring nodes 112,113.

The network node termination point MOs may be adapted to be represented by termination point to the neighbouring nodes 112, 113, MOs.

The identifiers may be adapted to be represented by respective PCIs.

The X2-C interface connections that are adapted to be setup for only one X2-C configuration out of all supported X2-C configurations A, B, C, may be adapted to comprise any one configuration out of:

A) A MORAN on single baseband network node towards a dedicated neighbouring network node of the same or another vendor, B) a MORAN on single baseband network node towards a shared neighbouring network node of the same or other vendor, or neighbouring network node of another vendor with a shared Multi Operator Core Network, MOCN, cell, and/or C) a MORAN on single baseband network node towards another MORAN on single baseband neighbouring network node.

The first network node 111 may be adapted to be represented by the MORAN on single baseband network node, and The one or more neighbouring network nodes 112, 113, may be adapted to be represented by any one or more out of: A the dedicated neighbouring network node or the neighbouring network node of the other vendor, B the shared neighbouring network node, or another vendor neighbouring network node with a shared MOCN cell, and/or C another MORAN on single baseband neighbouring network node.

The embodiments herein may be implemented through a respective processor or one or more processors, such as the processor 750 of a processing circuitry in the first network node 111 depicted in FIG. 7*a*, together with respective computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The network node 130 may further comprise a memory 760 comprising one or more memory units. The memory 760 comprises instructions executable by the processor in first network node 111. The memory 760 is arranged to be used to store e.g., ANR, initiated reports, identifiers identifying respective one or more neighbouring cells 116, 117, network node termination point MOs, indications, data, configurations, communication data, and applications to perform the methods herein when being executed in the first network node 111.

In some embodiments, a computer program 770 comprises instructions, which when executed by the respective at least one processor 760, cause the at least one processor of the first network node 111 to perform the actions above.

In some embodiments, a respective carrier 780 comprises the respective computer program 770, wherein the carrier 780 is one of an electronic signal, an optical signal, an electromagnetic signal, a magnetic signal, an electric signal, a radio signal, a microwave signal, or a computer-readable storage medium.

Those skilled in the art will appreciate that the units in the first network node 111 described above may refer to a combination of analog and digital circuits, and/or one or more processors configured with software and/or firmware, e.g. stored in the first network node 111, that when executed by the respective one or more processors such as the processors described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

Figure 8:
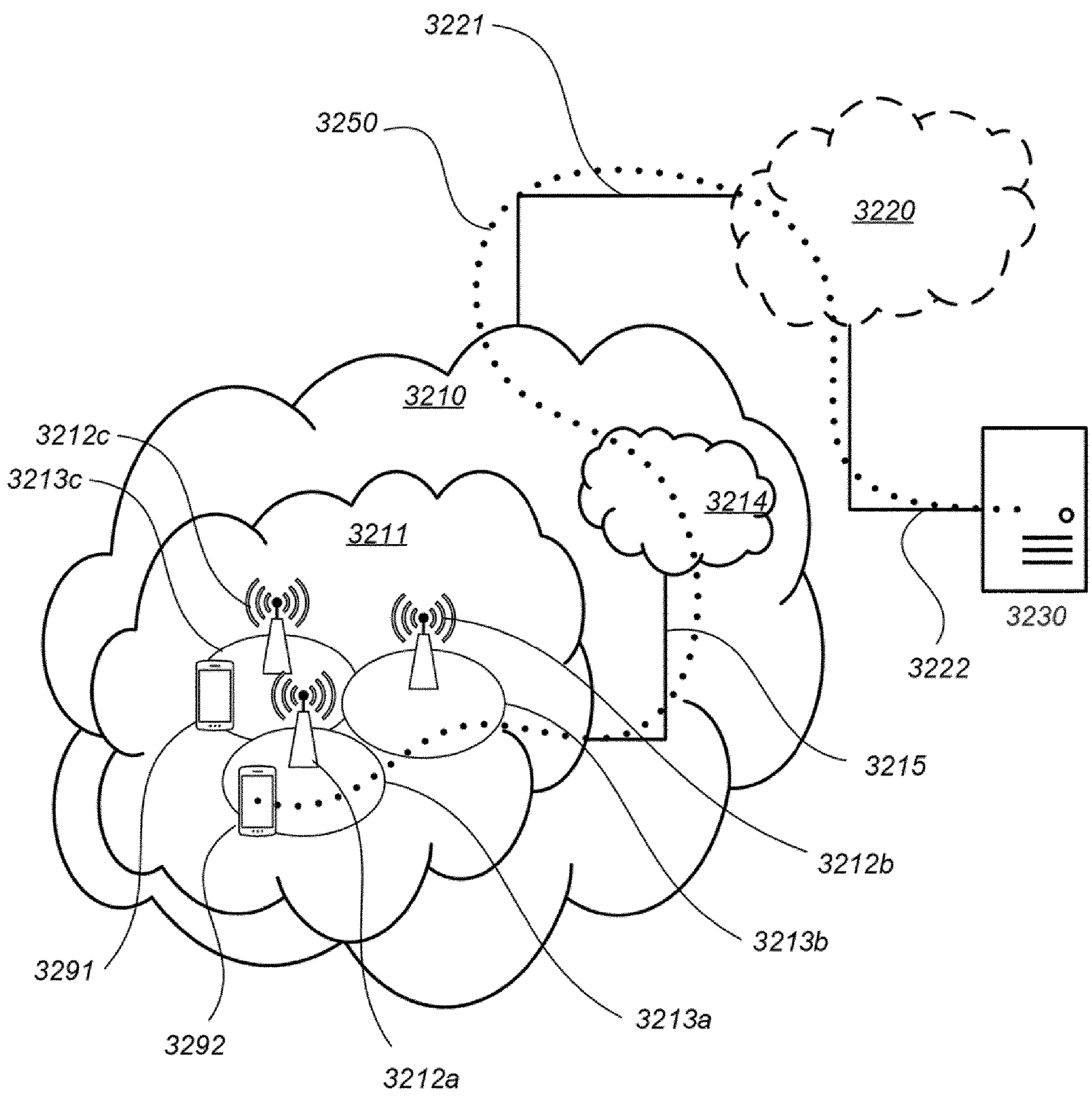
FIG. 8 schematically illustrates a telecommunication network connected via an intermediate network to a host computer.

With reference to FIG. 8, in accordance with an embodiment, a communication system includes a telecommunication network 3210, such as a 3GPP-type cellular network, e.g. communication network 100, which comprises an access network 3211, such as a radio access network, and a core network 3214. The access network 3211 comprises a plurality of base stations 3212*a*, 3212*b*, 3212*c*, such as the first network node 111, the neighbouring network nodes 112, 113, AP STAs NBs, eNBs, gNBs or other types of wireless access points, each defining a corresponding coverage area 3213*a*, 3213*b*, 3213*c*. Each base station 3212*a*, 3212*b*, 3212*c*, e.g. radio network nodes 141,142, is connectable to the core network 3214 over a wired or wireless connection 3215. A first user equipment (UE), e.g. remote end 120, such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 9 may be identical to the host computer 3230, one of the base stations 3212*a*, 3212*b*, 3212*c* and one of the UEs 3291, 3292 of FIG. 8, respectively. This is to say, the inner workings of these entities may be as shown in FIG. 9 and independently, the surrounding network topology may be that of FIG. 8.

Figure 9:
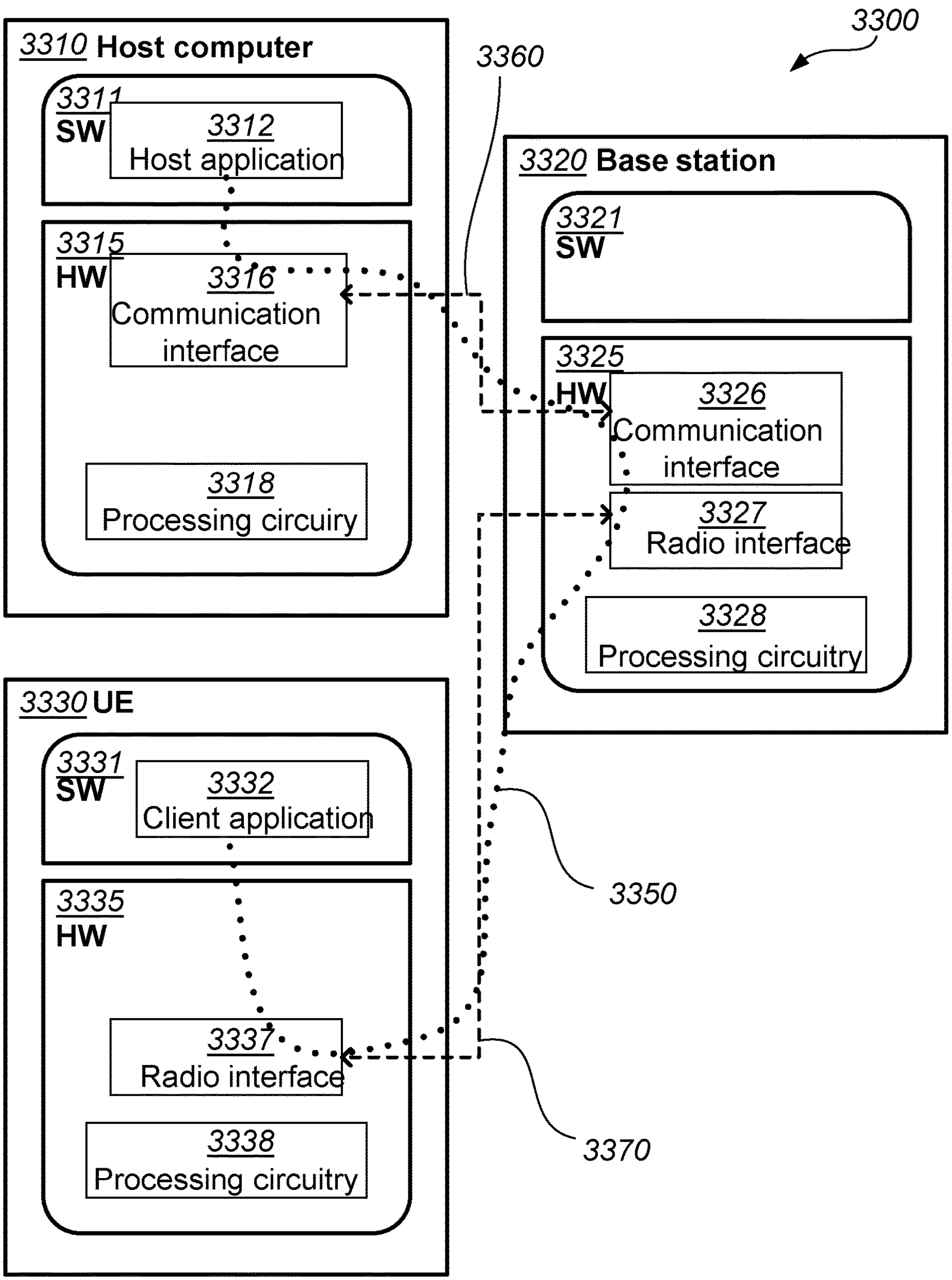
FIG. 9 is a generalized block diagram of a host computer communicating via a base station with a user equipment over a partially wireless connection.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as e.g. the applicable corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 10:
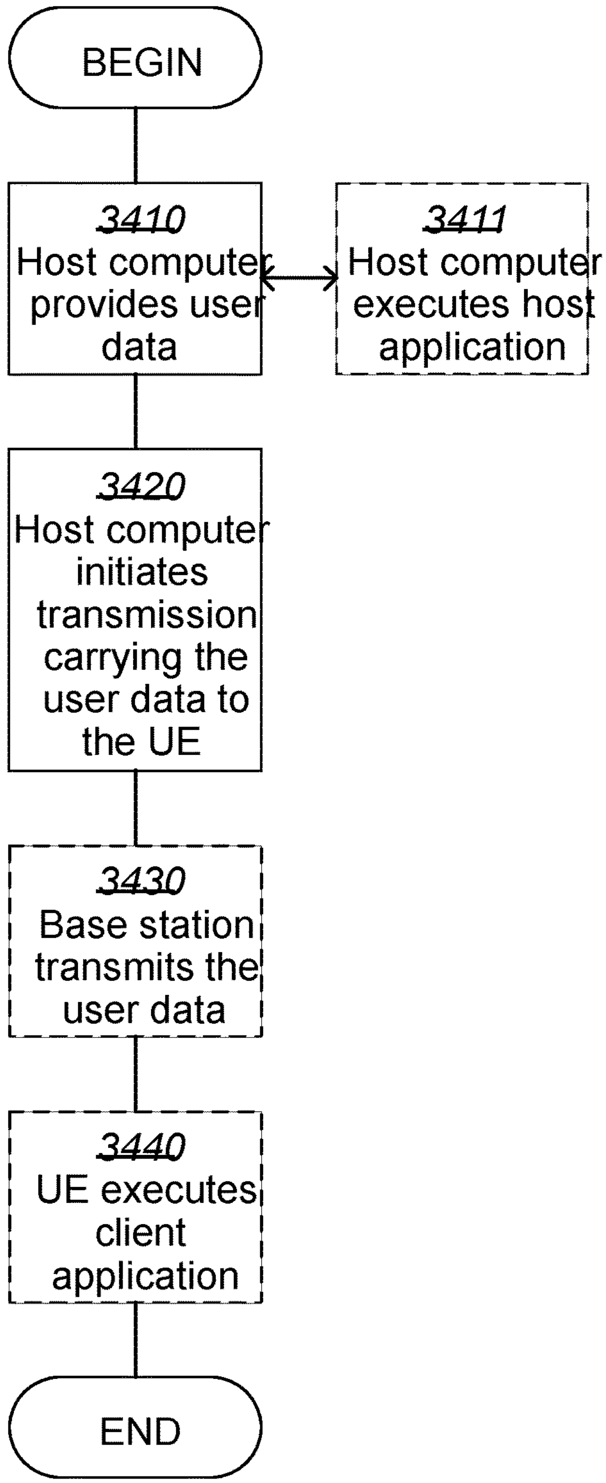
FIGS. 10-13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 10 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 11:
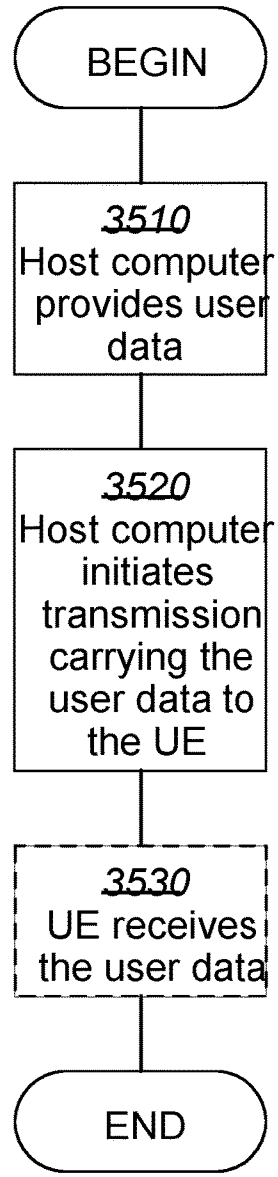

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 11 will be included in this section. In a first step 3510 of the method, the host computer provides user data. In an optional sub step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 12:
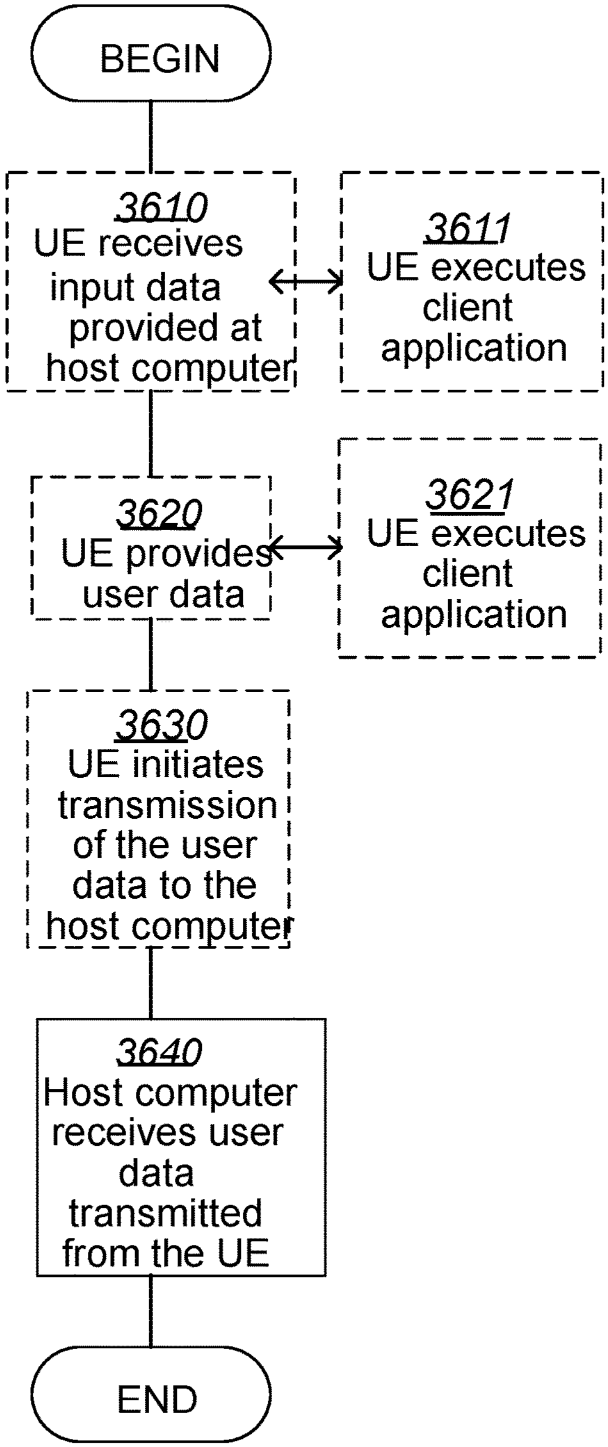

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional sub step 3621 of the second step 3620, the UE provides the user data by executing a client application. In a further optional sub step 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub step 3630, transmission of the user data to the host computer. In a fourth step 3640 of the method, the host computer receives the user data transmitted from the UE, in accordance with the teachings of the embodiments described throughout this disclosure.

Figure 13:
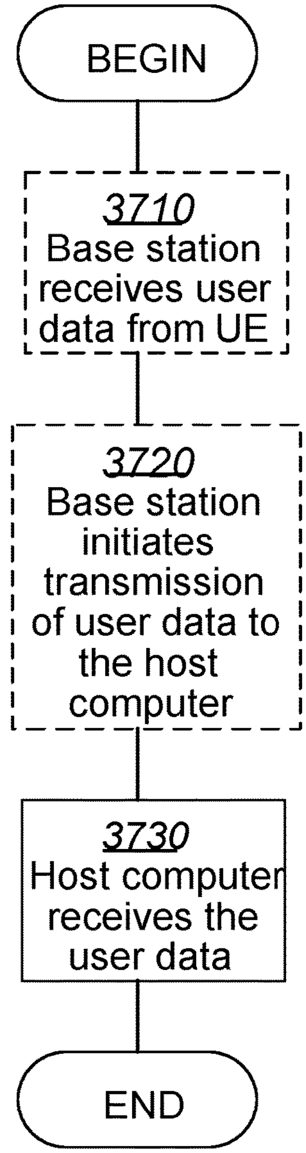

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 8 and FIG. 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word “comprise” or “comprising” it shall be interpreted as non-limiting, i.e. meaning “consist at least of”.

The embodiments herein are not limited to the above described preferred embodiments. Various alternatives, modifications and equivalents may be used.

| Abbreviation | Explanation |
|---|---|
| eNB | eNodeB (EUTRAN node) |
| X2 | 3GPP defined connection between eNodeBs according to 3GPP TS 36.423 |
| S1 | 3GPP defined connection between eNodeB and core MME according to 3GPP TS 36.413 |
| EUTRAN | Evolved Universal Terrestrial Radio Access Network |
| MORAN | Multi Operator Radio Access Network |
| MOCN | Multi Operator Core Network |
| PLMN | Public Land Mobile Network |
| RAN | Radio Access Network |
| SIB | System Information Block |
| ECGI | E-UTRAN Cell Global Identifier |
| PDN GW | Packet Data Network Gateway |
| HSS | Home Subscriber Server |
| MME | Mobility Management Entity |

The invention claimed is:

1. A method performed by a first network node for handling X2-C connection setups in a Multi Operator Radio Access Network (MORAN) system of a wireless communications network, which first network node is operating in the MORAN system, the method comprising:

when receiving an Automatic Neighbour Relation (ANR) initiated report from a UE, which report comprises one or more identifiers identifying respective one or more neighbouring cells, unlocking, or creating and unlocking one or more network node termination point Manage Objects (MOs) based on the respective identifier out of the one or more identifiers; and based on the unlocked, or created and unlocked one or more network node termination point MOs, initiating X2-C interface connection setups between the first network node and the respective one or more neighbouring nodes serving the respective identified one or more neighbouring cells, which X2-C interface connections are setup only for one X2-C configuration out of all supported X2-C configurations on the MORAN system based on the one or more identifiers, and which X2-C interface connections are related to each of the respective one or more neighbouring nodes.

2. The method according to claim 1, wherein the network node termination point MOs are represented by termination point to the neighbouring nodes MOs.

3. The method according to claim 1, wherein the identifiers are respective Physical Cell Identifiers (PCIs).

4. The method according to claim 1, wherein the MORAN system is represented by a MORAN on single baseband system.

5. The method according to claim 4, wherein all the supported X2-C configurations on the MORAN system related to each of the respective one or more neighbouring nodes comprise any one or more configuration out of:

a MORAN on single baseband network node towards a dedicated neighbouring network node of the same or another vendor;

a MORAN on single baseband network node towards a shared neighbouring network node of the same or other vendor, or neighbouring network node of another vendor with a shared Multi Operator Core Network (MOCN) cell; and a MORAN on single baseband network node towards another MORAN on single baseband neighbouring network node;

wherein the first network node is represented by the MORAN on single baseband network node; and wherein the one or more neighbouring network nodes are represented by any one or more out of: the dedicated neighbouring network node or the neighbouring network node of the other vendor; the shared neighbouring network node, or another vendor neighbouring network node with a shared MOCN cell; or another MORAN on single baseband neighbouring network node.

6. The method according to claim 1, further comprising:

wherein the unlocking, or creating and unlocking, of the one or more network node termination point MOs is performed when a match is found related to the MORAN system, of one or more Public Land Mobile Network (PLMN) Identifiers (IDs) of a first cell provided by the first network node, with an active PLMN ID of the one or more neighbouring cells.

7. The method according to claim 1, wherein the initiating of the X2-C interface connection setups between the first network node and the respective one or more neighbouring nodes comprises sending a X2-C connection setup request to the one or more neighbouring nodes.

8. A first network node configured to handling X2-C connection setups in a Multi Operator Radio Access Network (MORAN) system of a wireless communications network, which first network node is operable in the MORAN system, the first network node comprising:

a radio interface configured to receive an Automatic Neighbour Relation (ANR) initiated report from a UE, which report comprises one or more identifiers identifying respective one or more neighbouring cells; and processing circuitry configured to:

unlock, or create and unlock one or more network node termination point Manage Objects (MOs), based on the respective identifier out of the one or more identifiers; and based on the unlocked, or created and unlocked one or more network node termination point MOs, initiate X2-C interface connection setups between the first network node and the respective one or more neighbouring nodes serving the respective identified one or more neighbouring cells, which X2-C interface connections are setup only for one X2-C configuration out of all supported X2-C configurations on the MORAN system based on the one or more identifiers, and which X2-C interface connections are related to each of the respective one or more neighbouring nodes.

9. The first network node according to claim 8, wherein the network node termination point MOs are represented by termination point to the neighbouring nodes MOs.

10. The first network node according to claim 8, wherein the identifiers are respective Physical Cell Identifiers (PCIs).

11. The first network node according to claim 8, wherein the MORAN system is a MORAN on single baseband system.

12. The first network node according to claim 11, wherein the all the supported X2-C configurations on the MORAN system comprise any one or more configuration out of:

a MORAN on single baseband network node towards a dedicated neighbouring network node of the same or another vendor;

a MORAN on single baseband network node towards a shared neighbouring network node of the same or other vendor, or neighbouring network node of another vendor with a shared Multi Operator Core Network (MOCN) cell; and a MORAN on single baseband network node towards another MORAN on single baseband neighbouring network node;

wherein the first network node is adapted to be represented by the MORAN on single baseband network node; and wherein the one or more neighbouring network nodes are adapted to be represented by any one or more out of: the dedicated neighbouring network node or the neighbouring network node of the other vendor; the shared neighbouring network node, or another vendor neighbouring network node with a shared MOCN cell; or another MORAN on single baseband neighbouring network node.

13. The first network node according to claim 8, wherein the processing circuitry is configured to:

perform the unlocking, or creating and unlocking of the one or more network node termination point MOs responsive to finding a match related to the MORAN system of one or more Public Land Mobile Network (PLMN) Identifiers (IDs) of a first cell provided by the first network node, with an active PLMN ID of the one or more neighbouring cells.

14. The first network node according to claim 8, wherein the processing circuitry is configured to initiate the X2-C interface connection setups between the first network node and the respective one or more neighbouring nodes by further sending a X2-C connection setup request to the one or more neighbouring nodes.

* * * * *